US010443579B2

(12) United States Patent
Tobin et al.

(10) Patent No.: US 10,443,579 B2
(45) Date of Patent: Oct. 15, 2019

(54) TIP EXTENSIONS FOR WIND TURBINE ROTOR BLADES AND METHODS OF INSTALLING SAME

(71) Applicant: General Electric Company, Schenectady, NY (US)

(72) Inventors: James Robert Tobin, Simpsonville, SC (US); Richard Hardison, Greenville, SC (US); Jamie T. Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 354 days.

(21) Appl. No.: 15/351,486

(22) Filed: Nov. 15, 2016

(65) Prior Publication Data

US 2018/0135602 A1    May 17, 2018

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2230/23* (2013.01); *F05B 2230/80* (2013.01); *F05B 2250/183* (2013.01); *Y02E 10/721* (2013.01); *Y02P 70/523* (2015.11)

(58) Field of Classification Search
CPC ...... F03D 80/30; F03D 1/0675; F03D 1/0666; F03D 1/0683; Y02P 70/523; F05B 2230/23; F05B 2230/80; F05B 2250/183; Y02E 10/721
USPC .............................................. 416/87, 146 R
See application file for complete search history.

(56) References Cited

U.S. PATENT DOCUMENTS

| RE19,412 E | 1/1935 | Zaparka |
| 2,450,440 A | 10/1948 | Mills |
| 3,137,887 A | 6/1964 | Manning et al. |
| 3,528,753 A | 9/1970 | Dutton et al. |
| 3,586,460 A | 6/1971 | Toner |
| 4,329,119 A | 5/1982 | Baskin |

(Continued)

FOREIGN PATENT DOCUMENTS

| KR | 10-1133411 B1 | 4/2012 |
| WO | WO2012/076168 A2 | 6/2012 |

(Continued)

OTHER PUBLICATIONS

U.S. Appl. No. 14/706,022, filed May 7, 2015.

(Continued)

*Primary Examiner* — David E Sosnowski
*Assistant Examiner* — Brian P Wolcott
(74) *Attorney, Agent, or Firm* — Dority & Manning, P.A.

(57) ABSTRACT

The present disclosure is directed to tip extensions for wind turbine rotor blades and methods of installing same. The method includes removing a removable blade tip of a lightning protection system from the rotor blade so as to expose a down conductor of the lightning protection system. The method also includes securing a conductive extension to the down conductor. Moreover, the method includes sliding the first end of the tip extension over the conductive extension so as to overlap the rotor blade at the tip end. In addition, the method includes securing the removable blade tip to the conductive extension at the second end of the tip extension. Further, the method includes securing the tip extension to the rotor blade.

17 Claims, 18 Drawing Sheets

(56) References Cited

U.S. PATENT DOCUMENTS

| | | |
|---|---|---|
| 4,626,172 A | 12/1986 | Mouille et al. |
| 5,088,665 A | 2/1992 | Vijgen et al. |
| 5,346,367 A | 9/1994 | Doolin et al. |
| 6,890,152 B1 | 5/2005 | Thisted |
| 7,059,833 B2 | 6/2006 | Stiesdal et al. |
| 7,458,777 B2 | 12/2008 | Herr |
| 7,637,721 B2 | 12/2009 | Driver et al. |
| 7,988,421 B2 | 8/2011 | Bakhuis et al. |
| 8,083,488 B2 | 12/2011 | Fritz |
| 8,162,590 B2 | 4/2012 | Haag |
| 8,376,450 B1 | 2/2013 | Long et al. |
| 8,678,746 B2 | 3/2014 | Haag |
| 9,458,821 B2 | 10/2016 | Jacobsen et al. |
| 2007/0065290 A1 | 3/2007 | Herr |
| 2007/0077150 A1 | 4/2007 | Llorente Gonzalez |
| 2008/0193292 A1 | 8/2008 | Stam et al. |
| 2009/0074585 A1 | 3/2009 | Koegler et al. |
| 2010/0135806 A1 | 6/2010 | Benito |
| 2010/0296940 A1 | 11/2010 | Zuteck |
| 2010/0296941 A1 | 11/2010 | Zuteck |
| 2011/0076149 A1 | 3/2011 | Santiago et al. |
| 2011/0097326 A1 | 4/2011 | Luehrsen |
| 2011/0135467 A1 | 6/2011 | Saddoughi et al. |
| 2011/0142635 A1 | 6/2011 | Frizt |
| 2011/0142668 A1 | 6/2011 | Rao |
| 2011/0223028 A1 | 9/2011 | Stege et al. |
| 2011/0243736 A1 | 10/2011 | Bell |
| 2011/0268558 A1 | 11/2011 | Driver |
| 2011/0305574 A1* | 12/2011 | Stiesdal ................ F03D 1/065 416/146 R |
| 2012/0003094 A1* | 1/2012 | Hansen ................ F03D 1/0675 416/146 R |
| 2012/0027590 A1 | 2/2012 | Bonnet |
| 2012/0121430 A1 | 5/2012 | Olsen et al. |
| 2014/0186175 A1 | 7/2014 | Baehmann et al. |
| 2014/0301855 A1* | 10/2014 | Busbey ................ F03D 1/0641 416/223 R |
| 2016/0090963 A1* | 3/2016 | Hoffmann ............ F03D 1/0675 416/223 R |
| 2016/0177915 A1 | 6/2016 | Gonzalez et al. |
| 2016/0258423 A1* | 9/2016 | Whitehouse ............ F03D 80/30 |
| 2016/0327020 A1* | 11/2016 | Tobin .................... F03D 1/0633 |

FOREIGN PATENT DOCUMENTS

| | | |
|---|---|---|
| WO | WO2013/023745 A1 | 2/2013 |
| WO | 2018/019349 A1 | 2/2018 |

OTHER PUBLICATIONS

U.S. Appl. No. 14/706,024, filed May 7, 2015.

International Search Report and Written Opinion issued in connection with corresponding PCT Application No. PCT/US18/29808 dated Oct. 26, 2018.

* cited by examiner

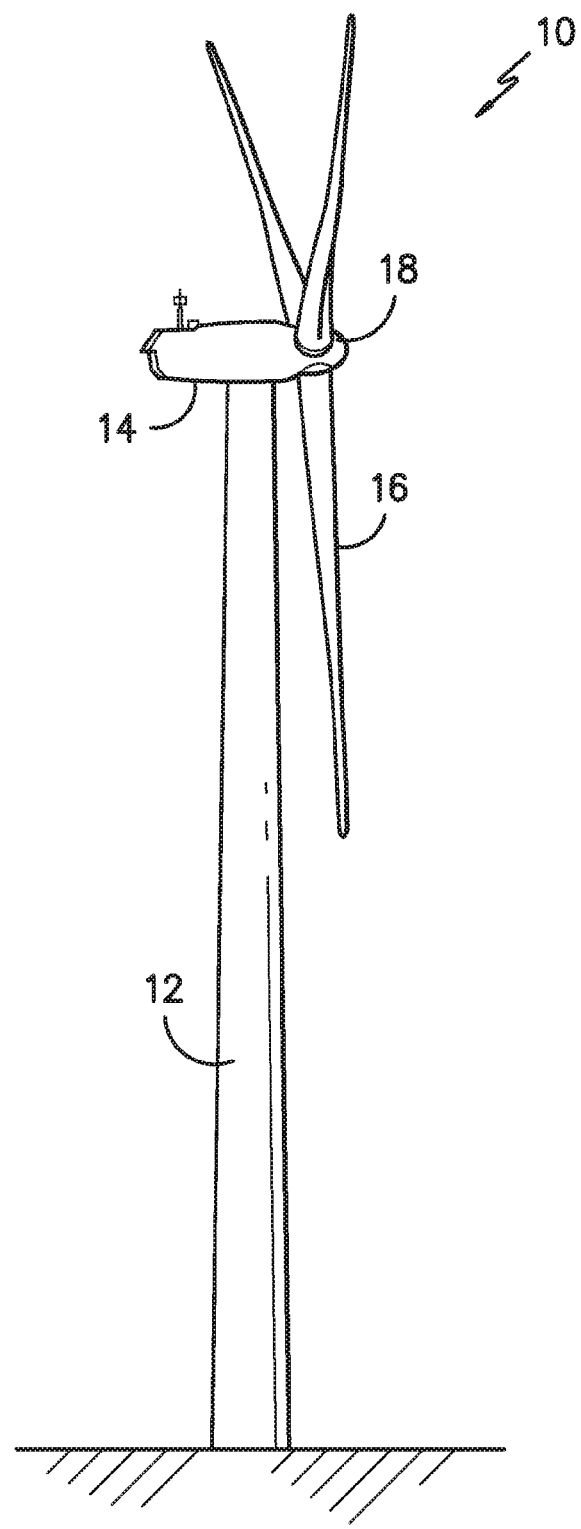
FIG. -1-

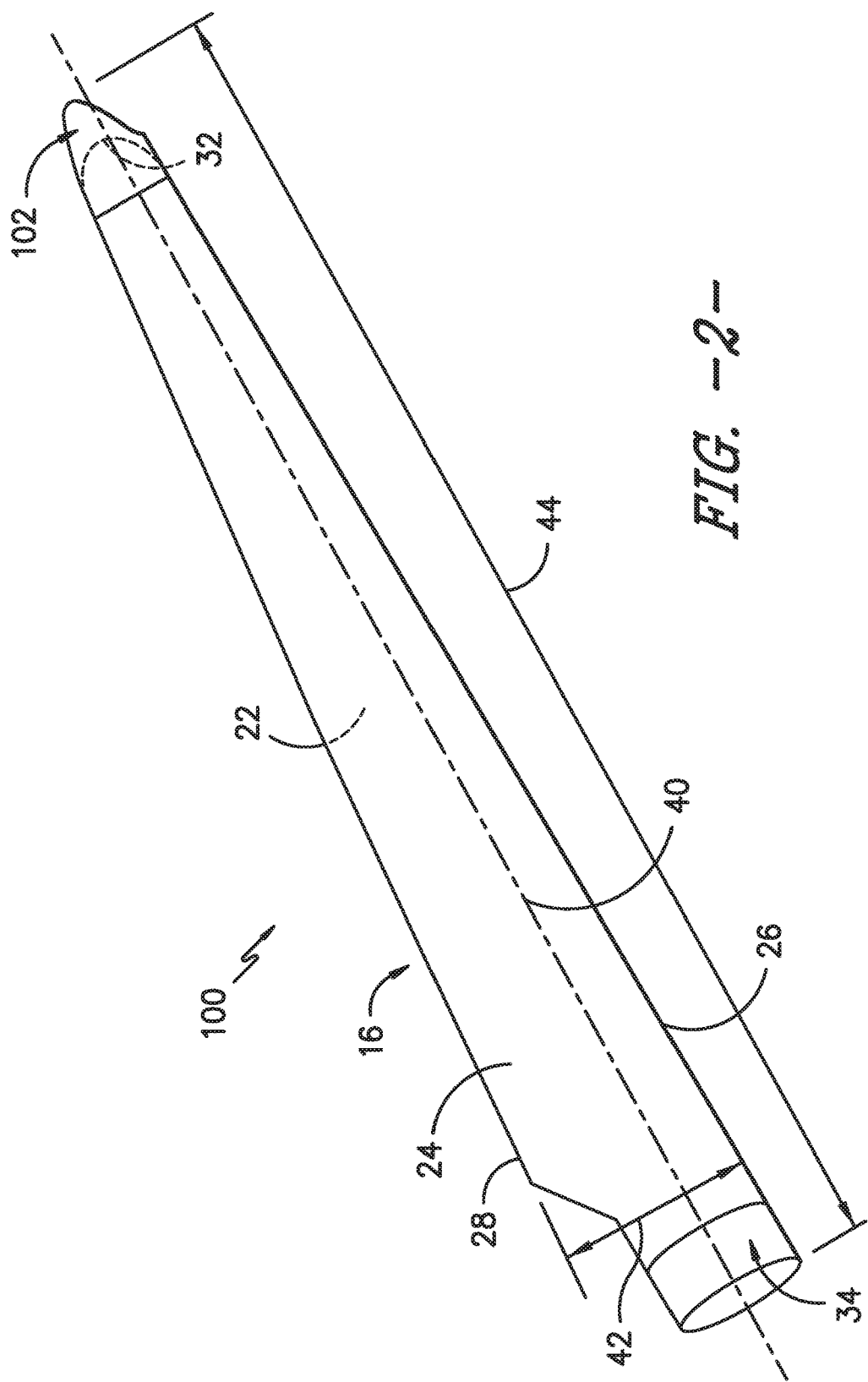
FIG. -2-

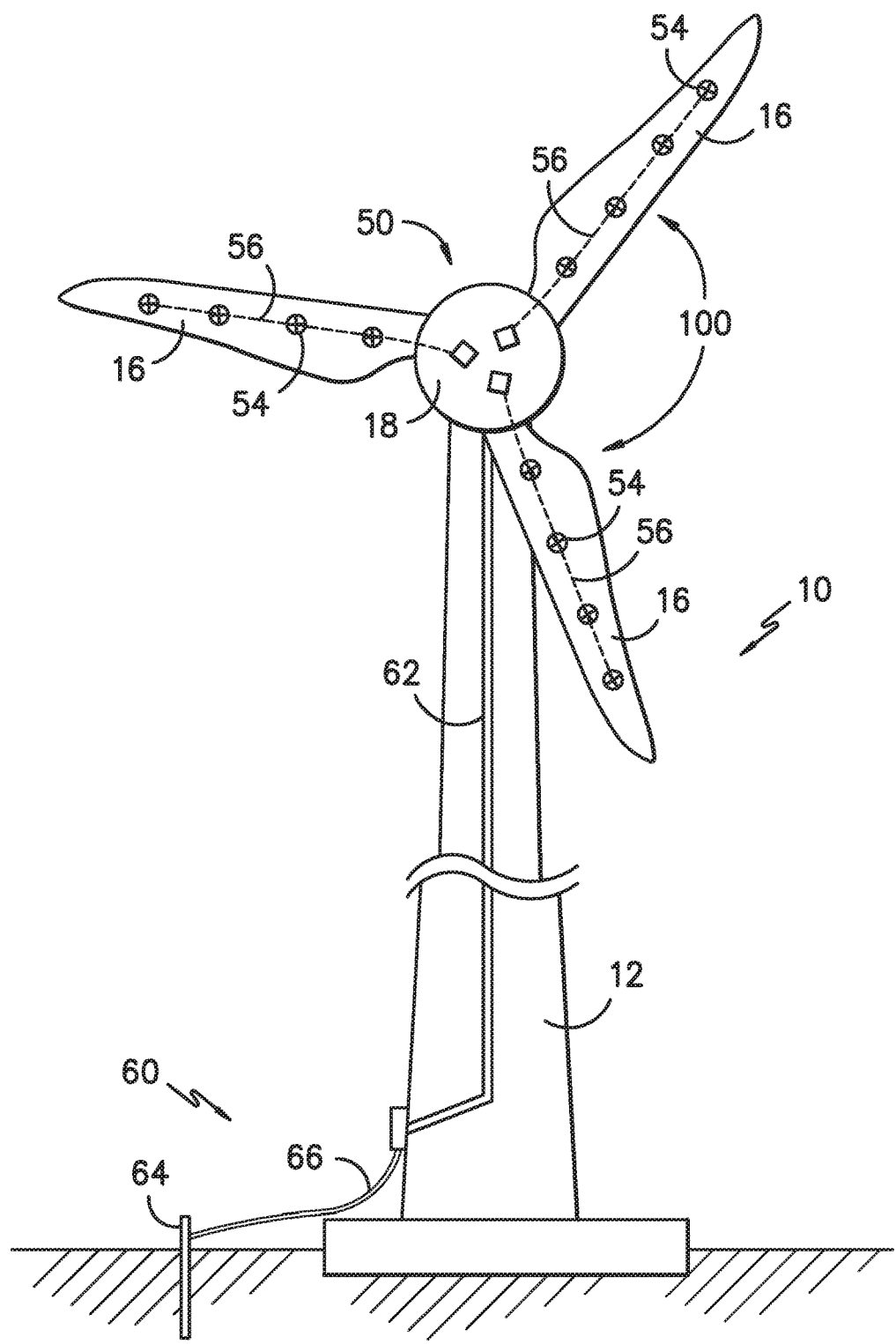
FIG. -3-

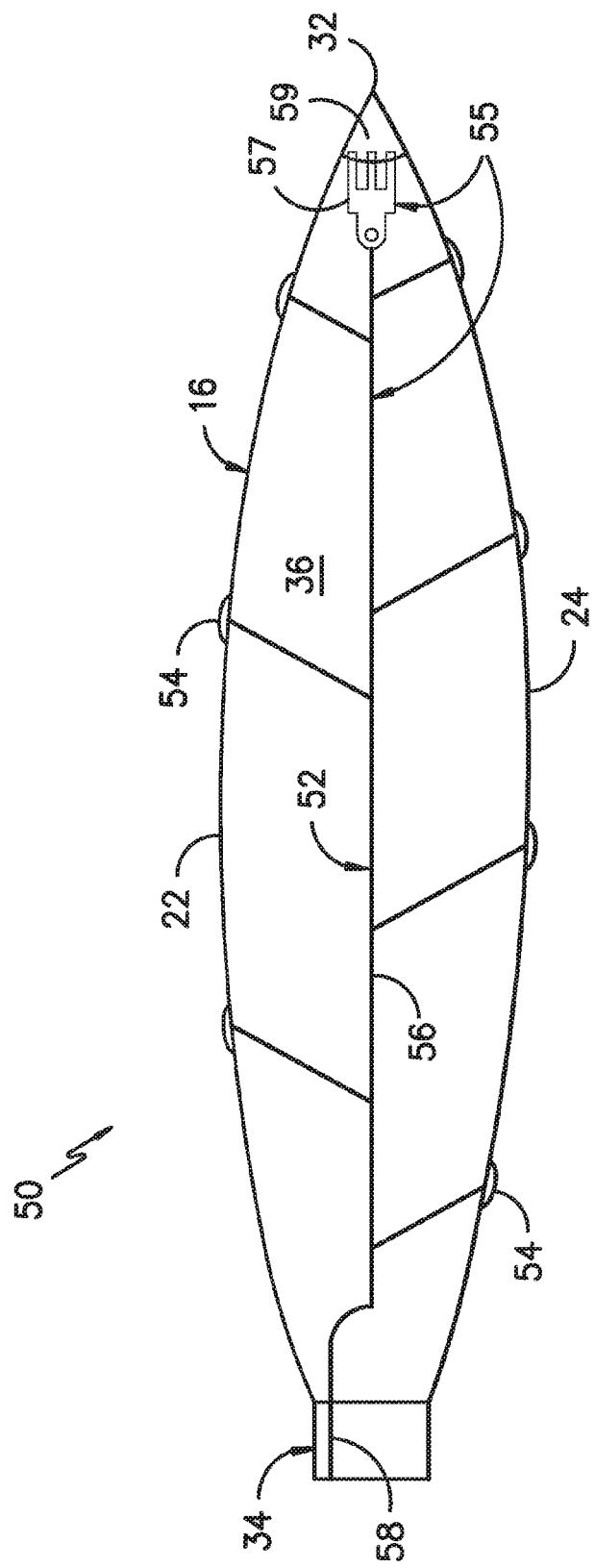
FIG. -4-

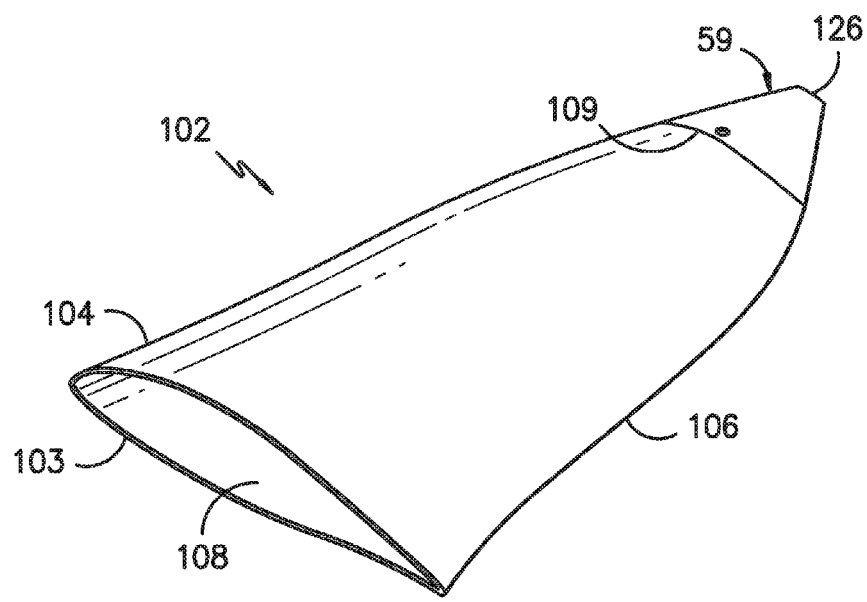
FIG. -5-
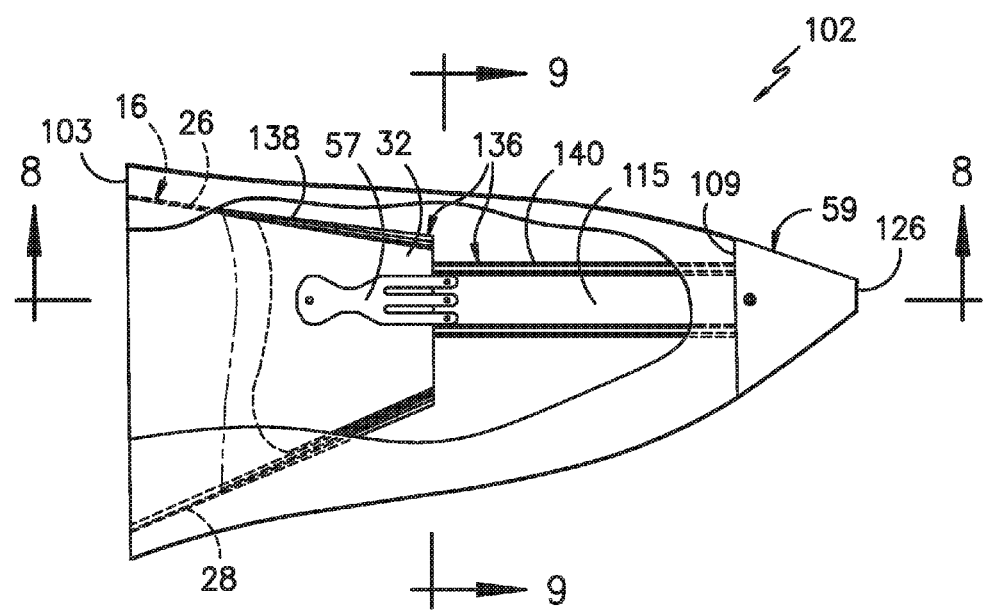
FIG. -6-

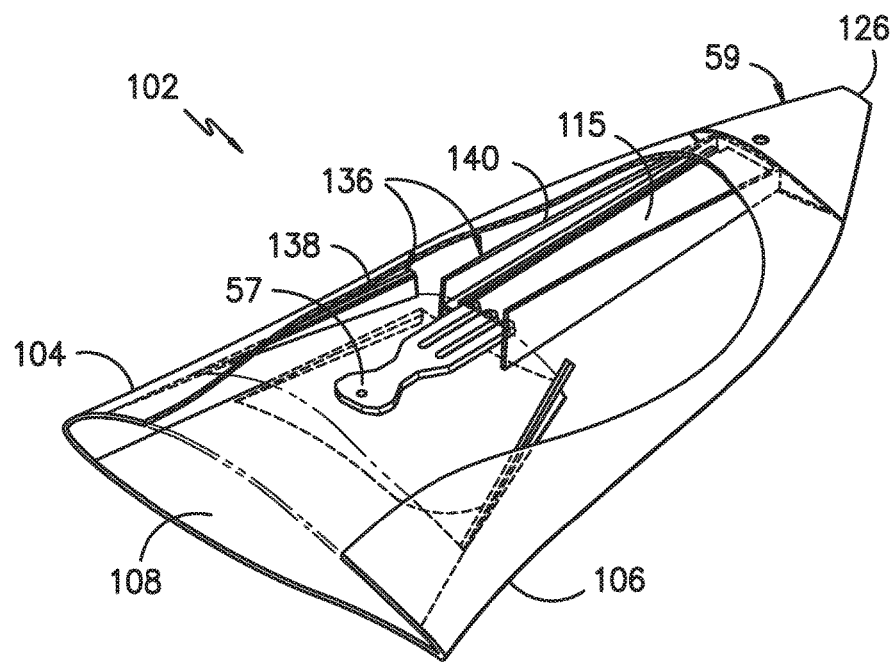
FIG. -7-
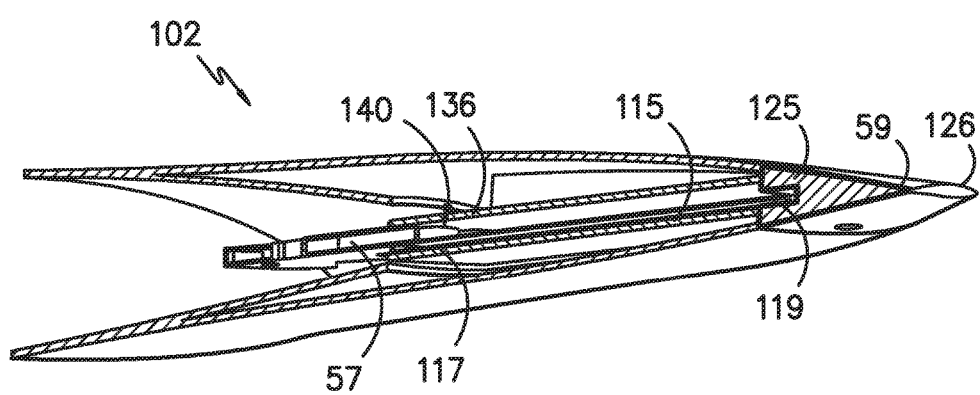
FIG. -8-

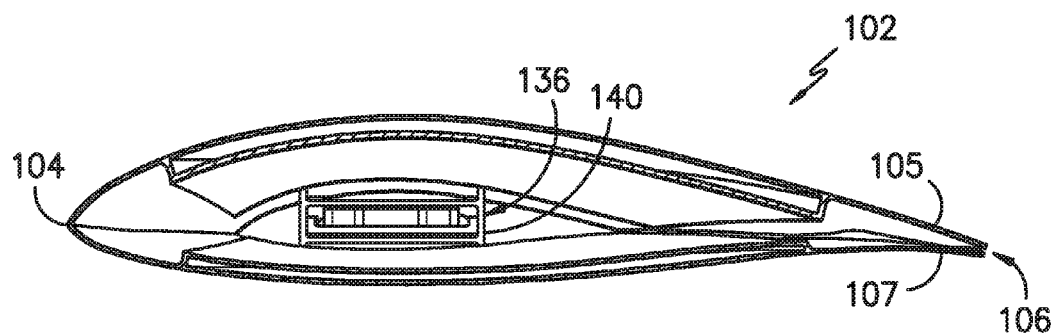
FIG. -9-
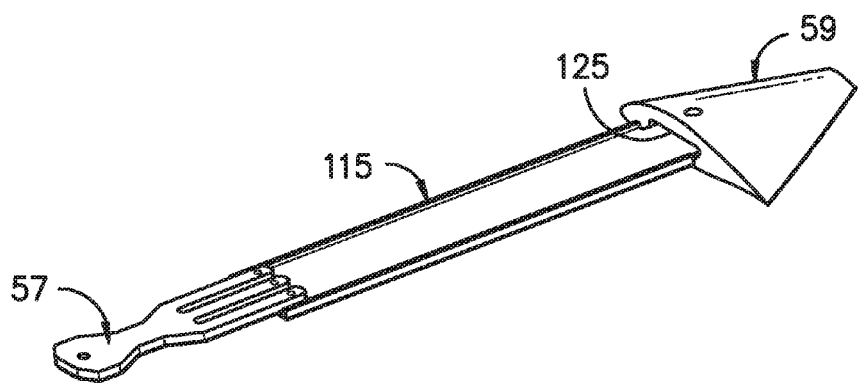
FIG. -10-
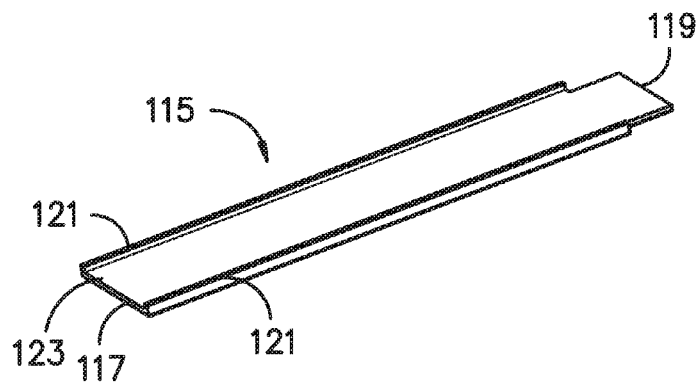
FIG. -11-

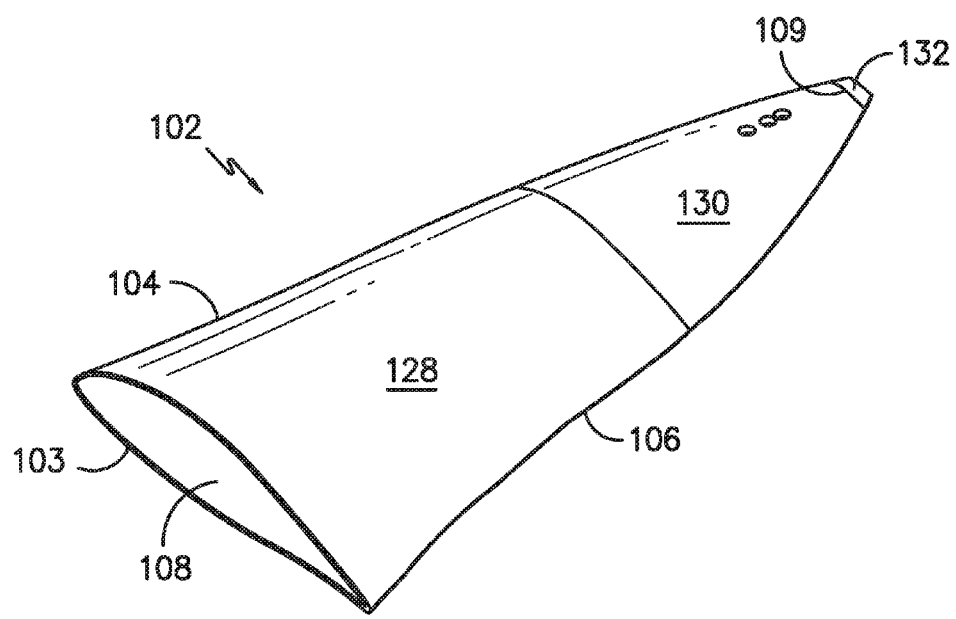
FIG. -12-
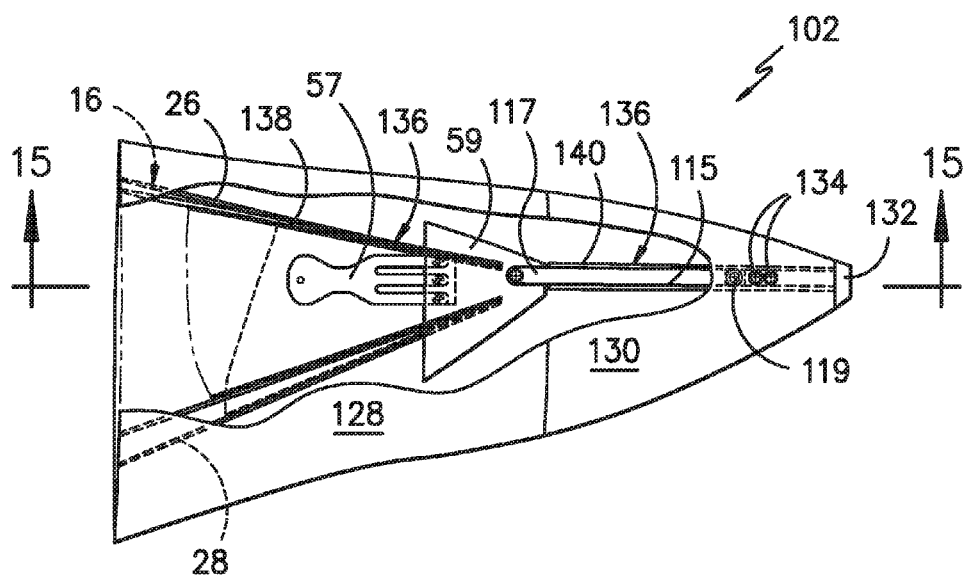
FIG. -13-

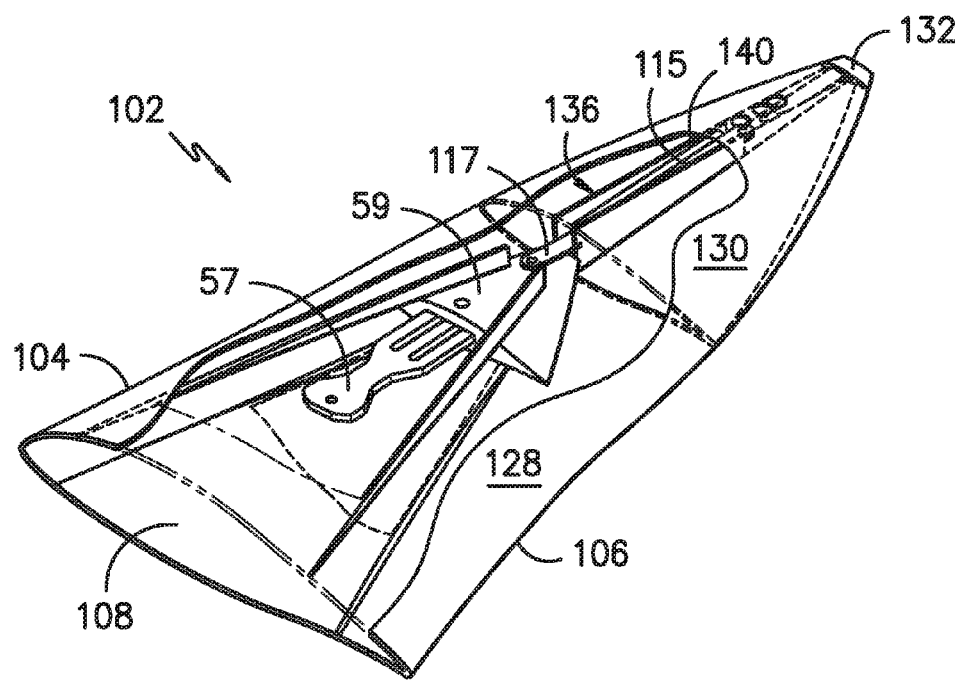
FIG. -14-
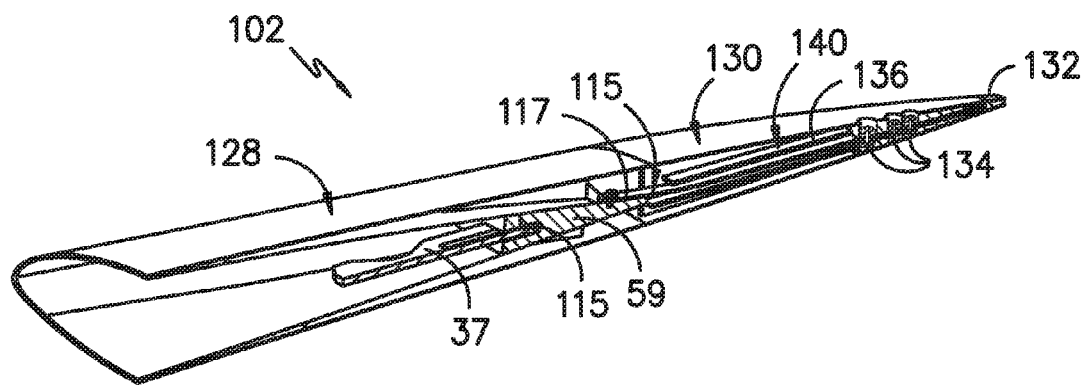
FIG. -15-

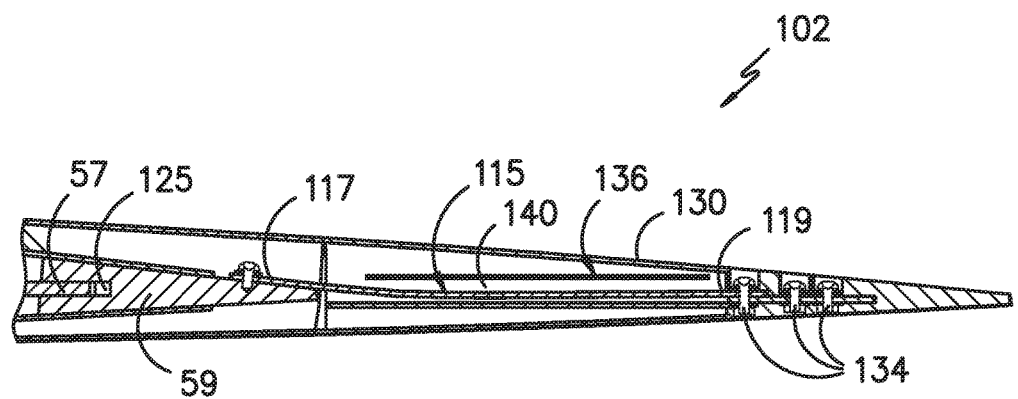
FIG. -16-
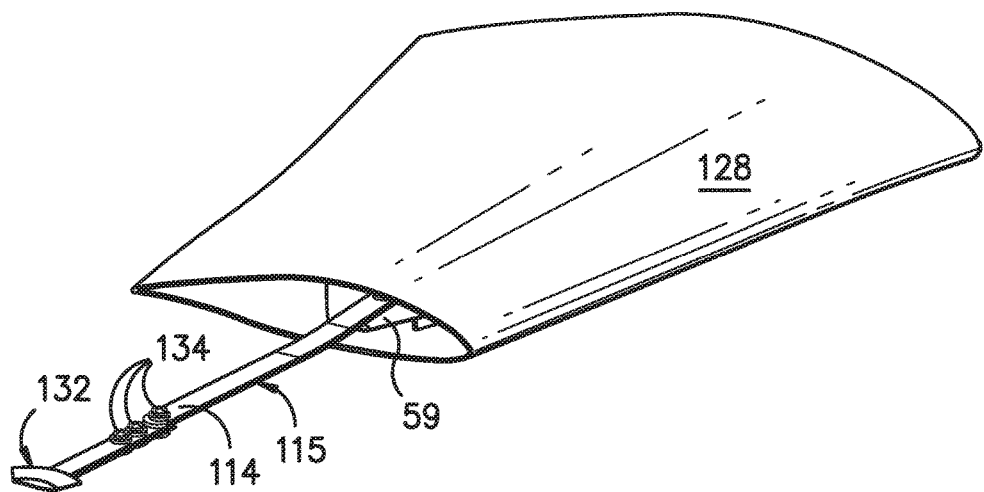
FIG. -17-

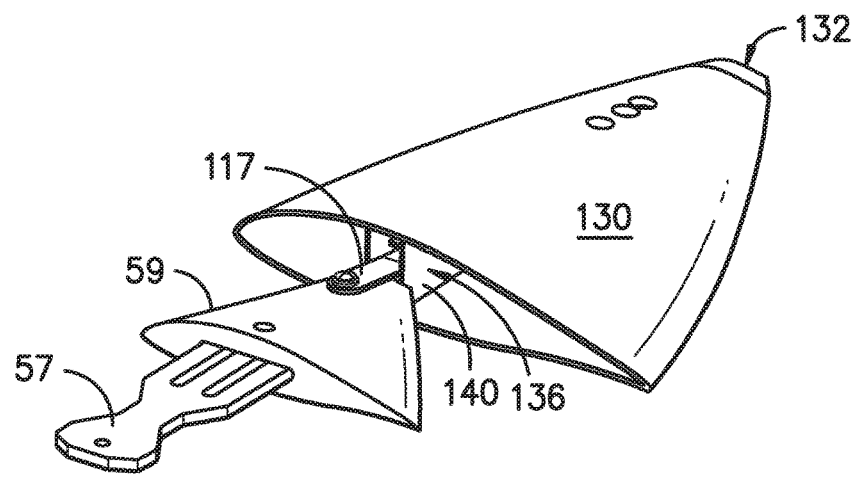
FIG. -18-
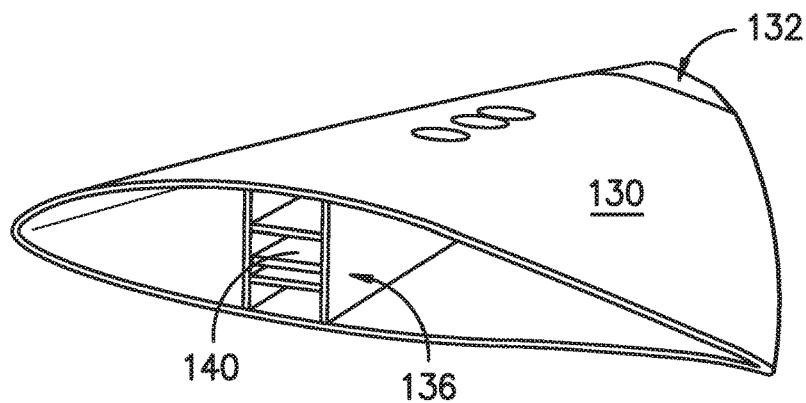
FIG. -19-
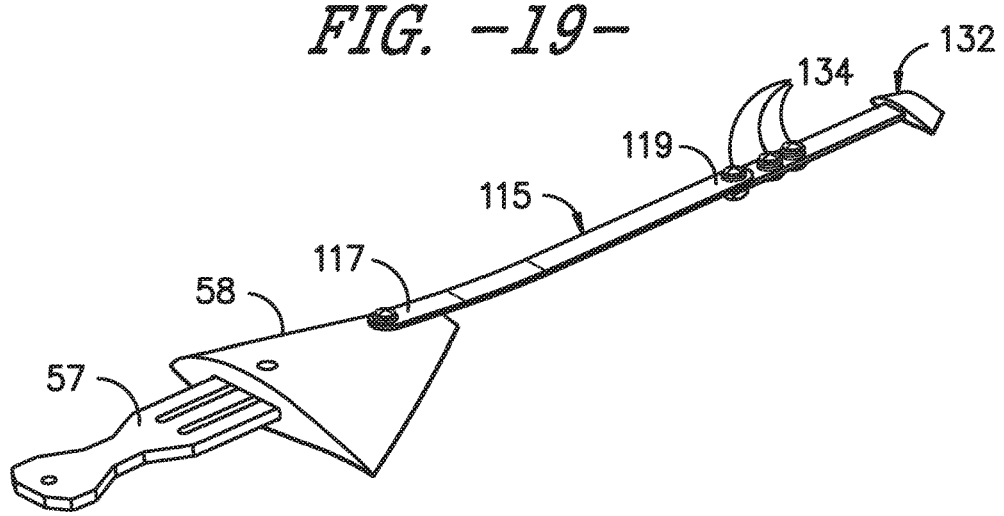
FIG. -20-

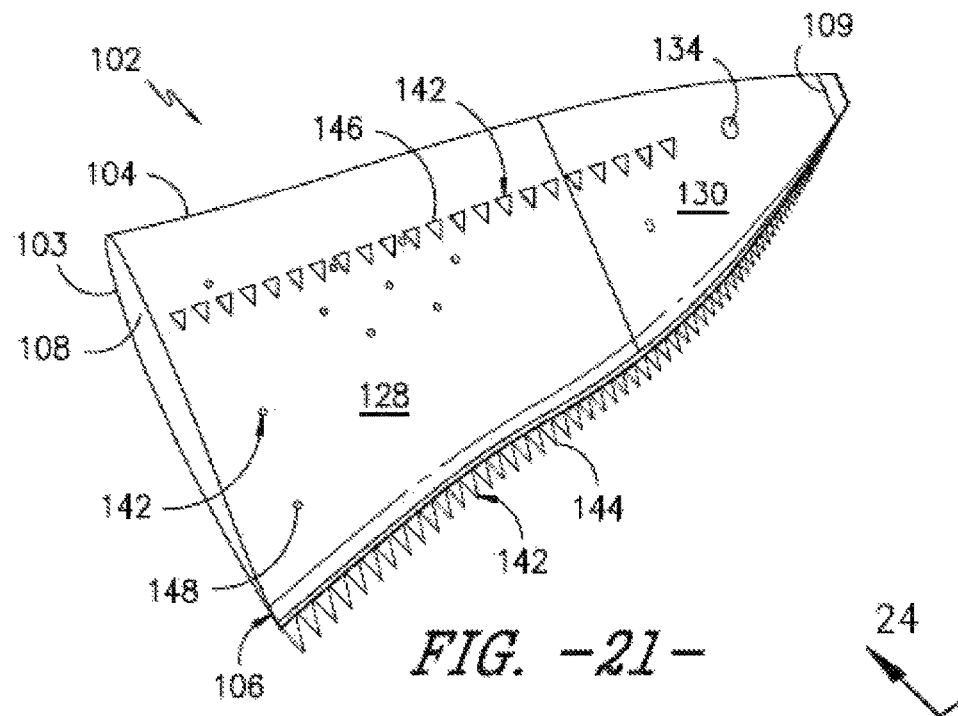
FIG. -21-
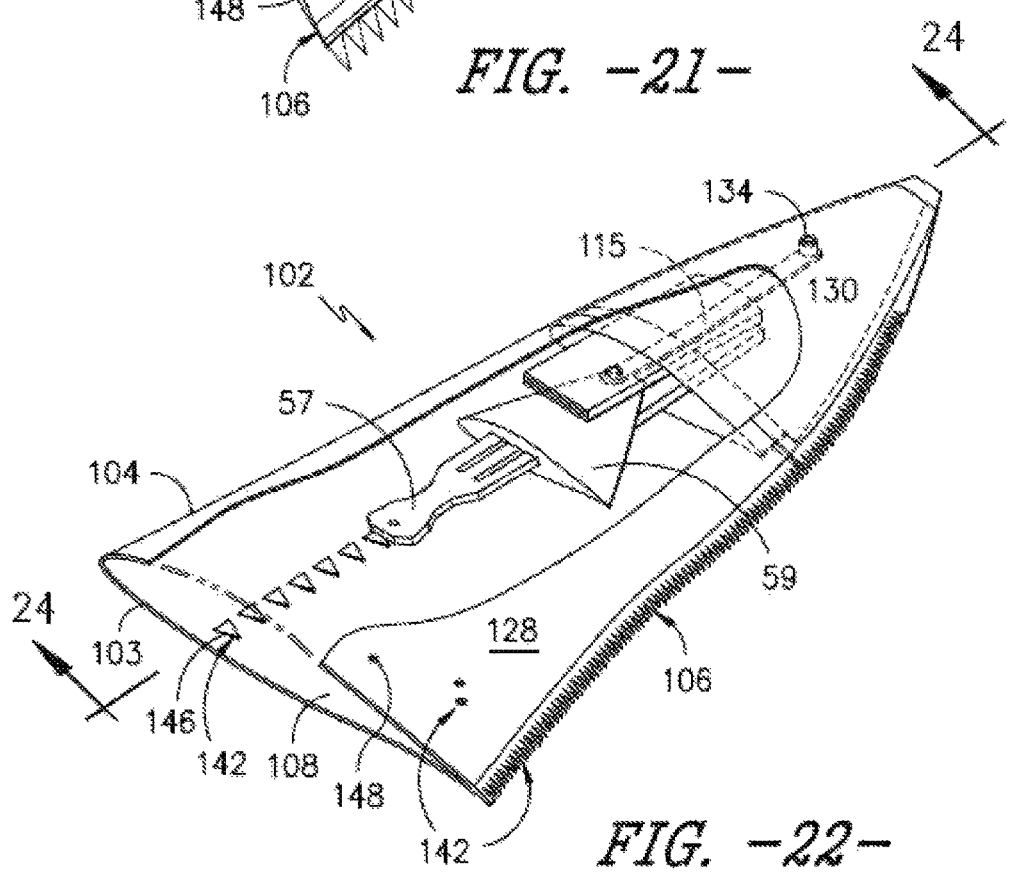
FIG. -22-

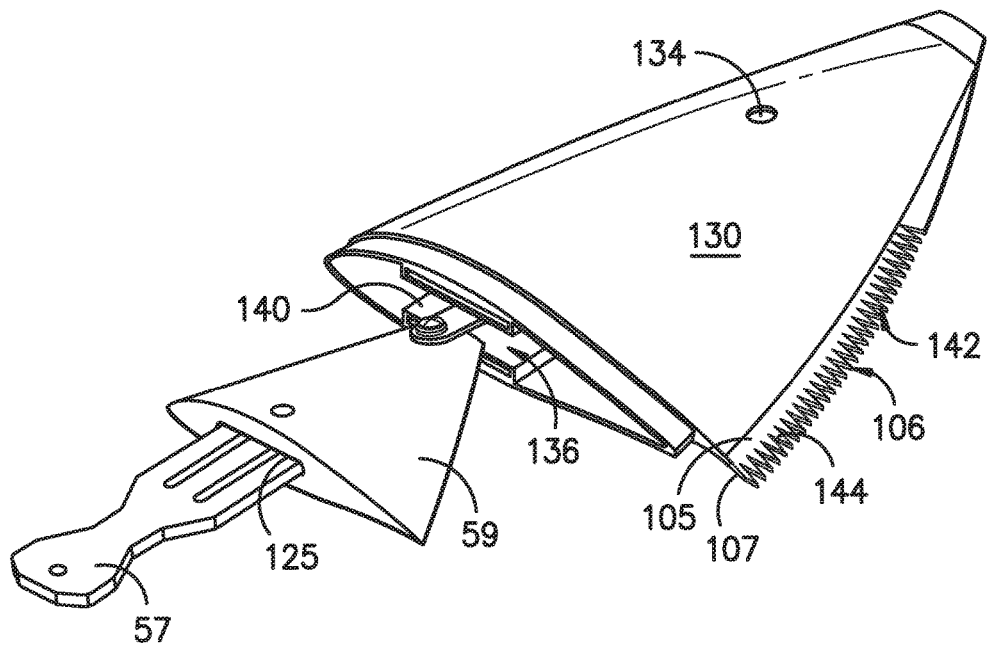
FIG. -23-
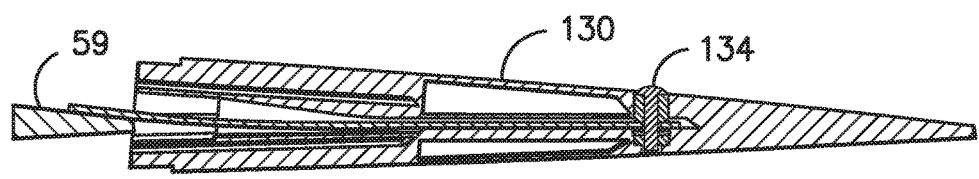
FIG. -24-

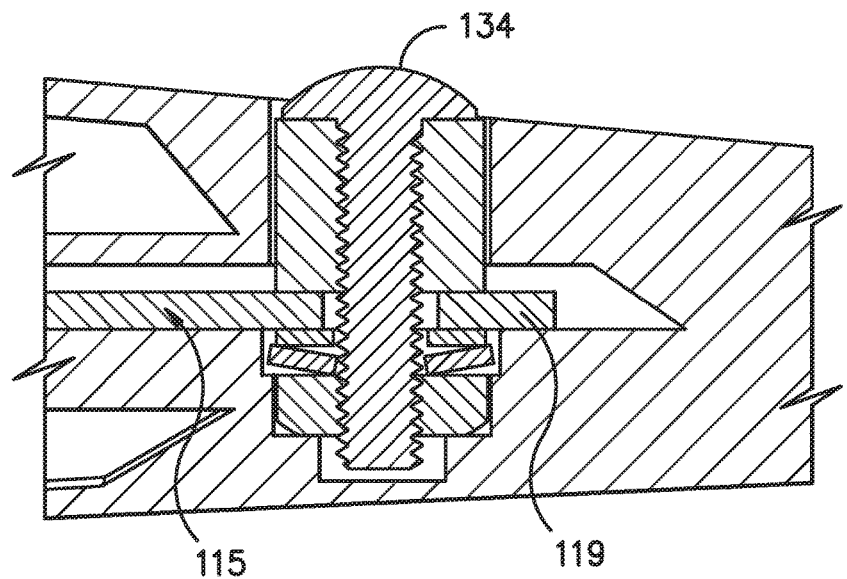
FIG. -25-
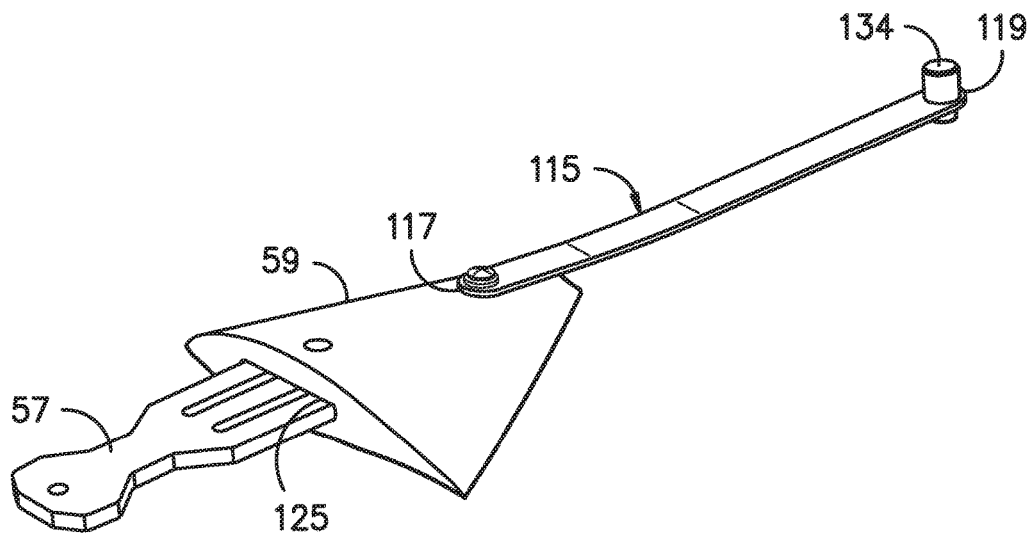
FIG. -26-

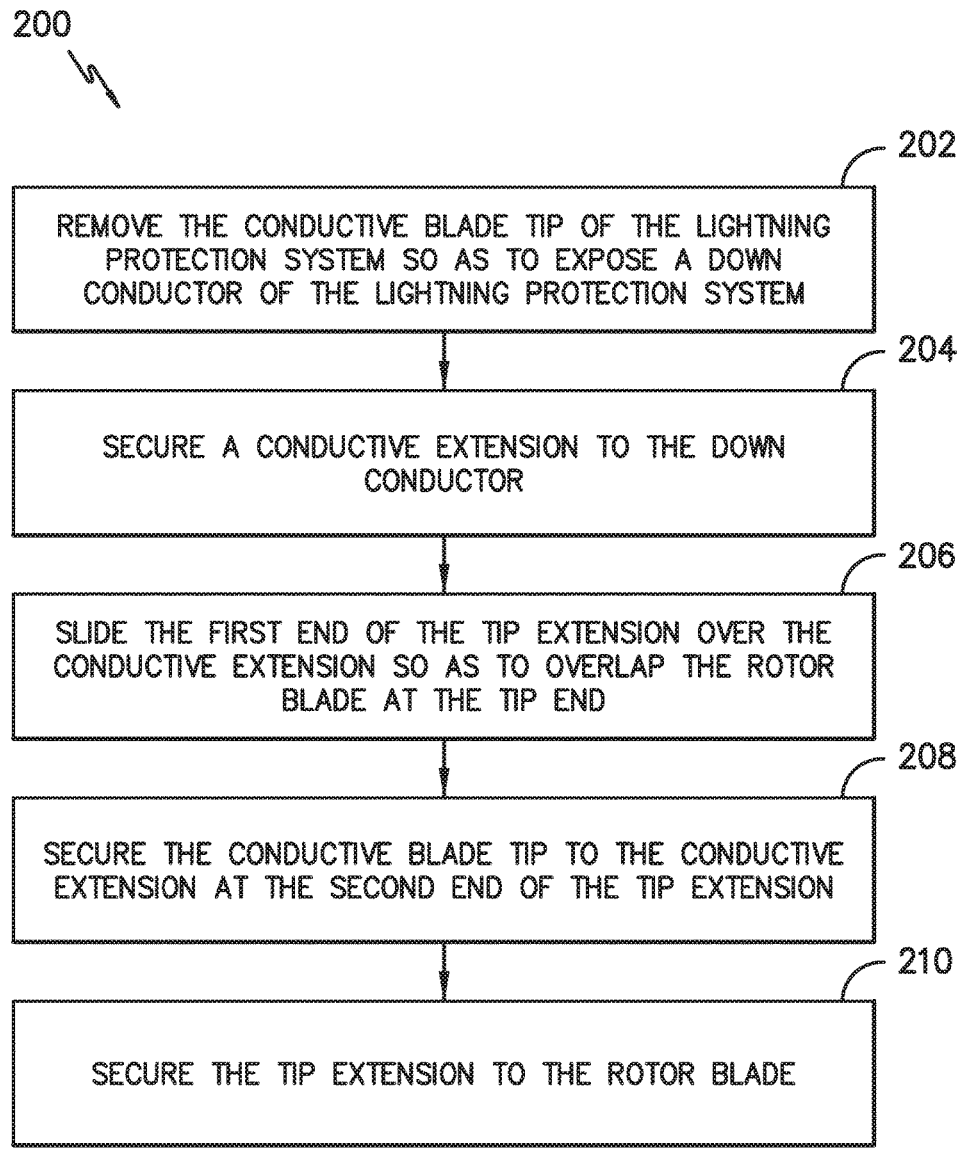
FIG. -27-

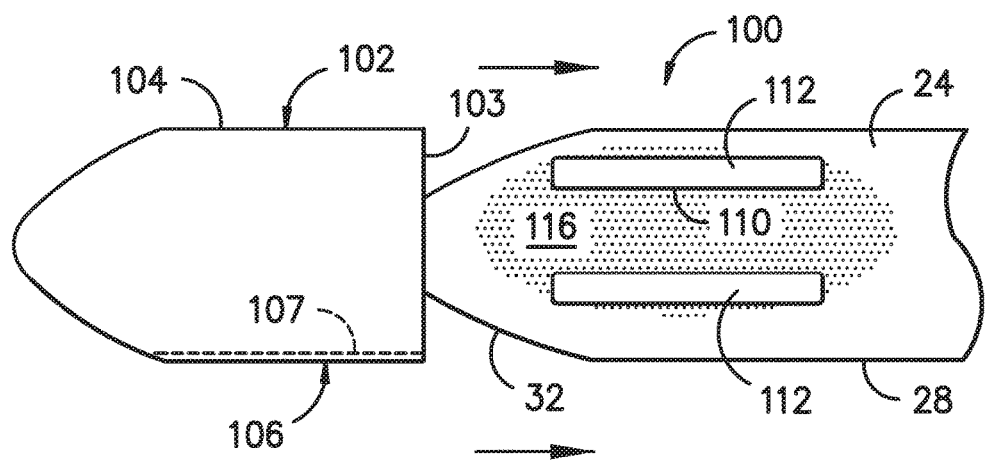
FIG. -28-
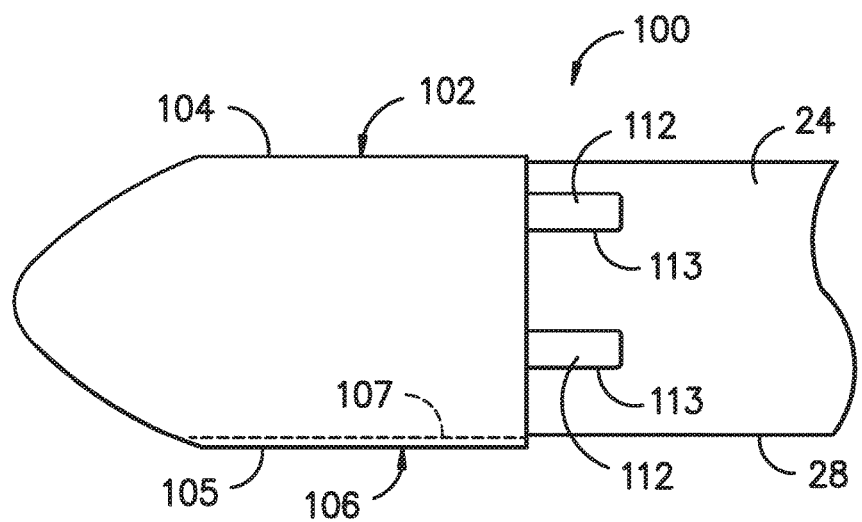
FIG. -29-

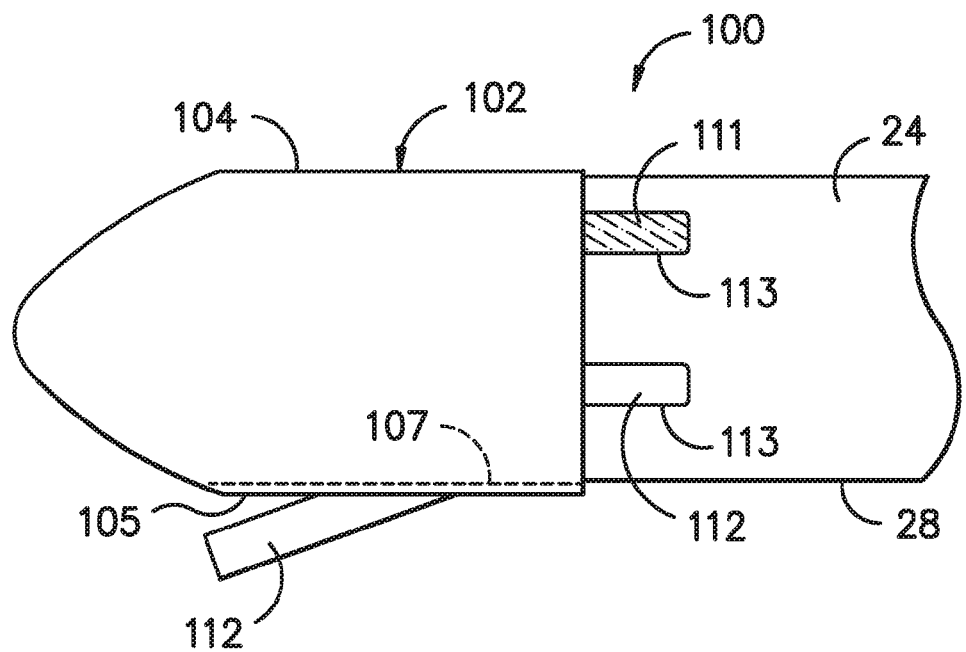
FIG. -30-
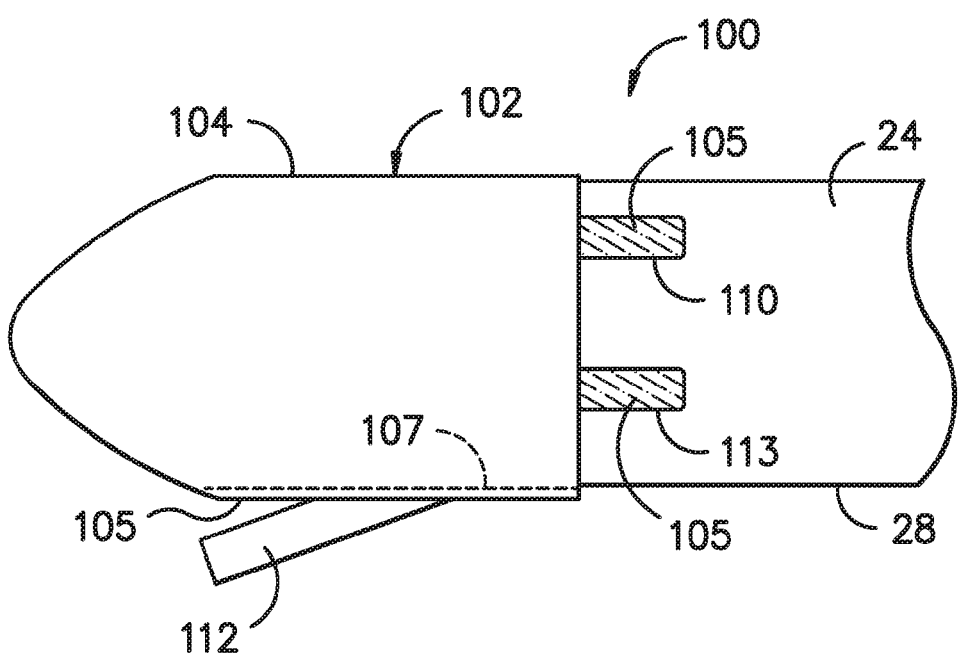
FIG. -31-

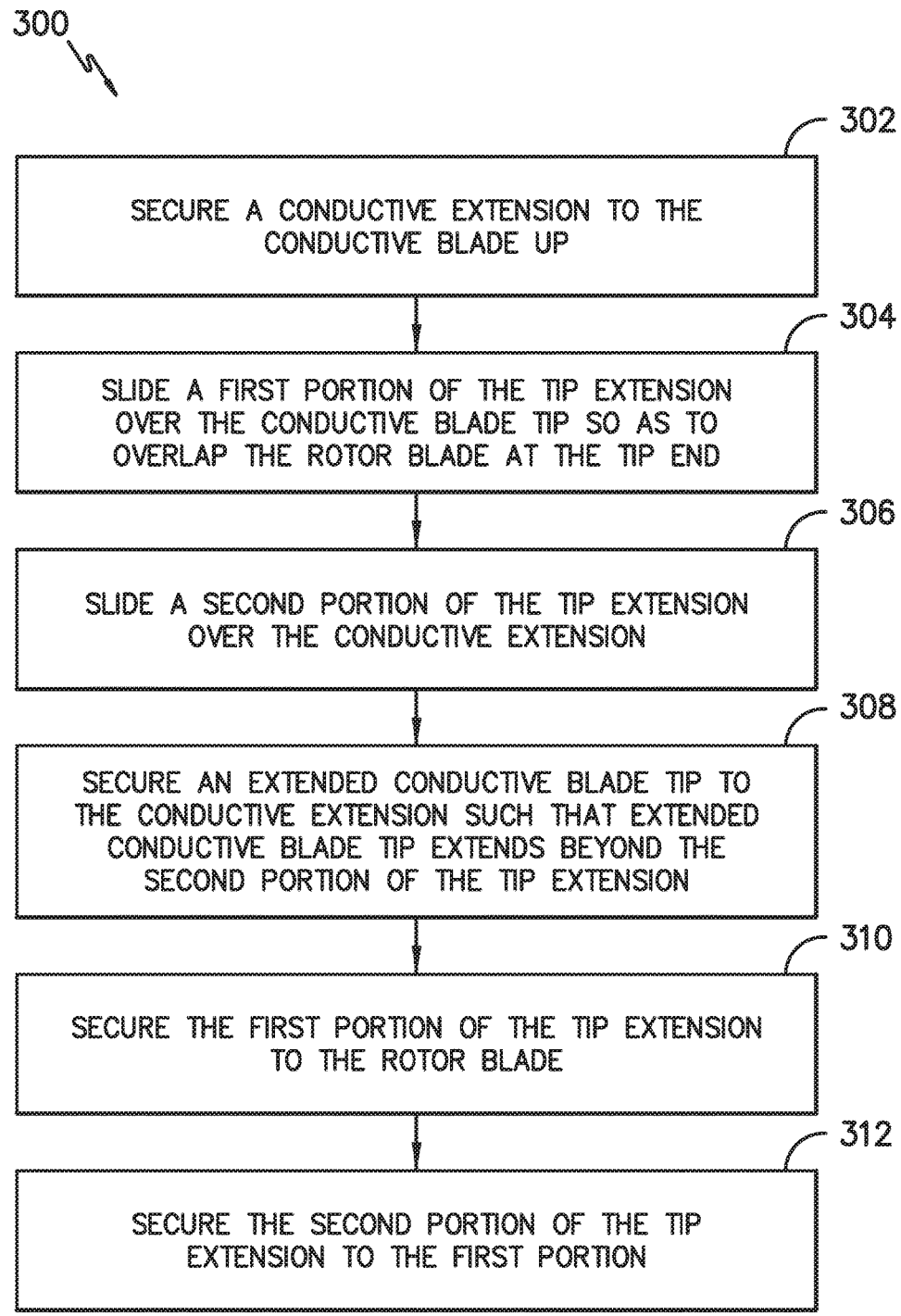

TIP EXTENSIONS FOR WIND TURBINE ROTOR BLADES AND METHODS OF INSTALLING SAME

FIELD OF THE INVENTION

The present disclosure relates in general to wind turbine rotor blades, and more particularly to tip extensions for wind turbine rotor blades that tie into existing lightning protection systems thereof and methods of installing same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures to the surface of the blade in order to increase the energy conversion efficiency during normal operation of the wind turbine by increasing the lift force of the blades while decreasing the drag force. Such components include, for example, winglets, tip extensions, and vortex generators. The purposes and operational principals of these devices are well understood by those skilled in the art.

The installation techniques and systems for attaching conventional add-on components can be expensive and time consuming, particularly for field installations. For example, typical field installation techniques require the use of attachment fixtures and significant dwell time for curing the attachment adhesives. Further, especially for the addition of tip extensions, a prevalent conventional method involves cutting off the existing blade tip so as to integrate the extension with the internal blade structure. Such processes can be time consuming, expensive, and may damage the main blade structure. Moreover, such processes may compromise the structural integrity and/or durability of the rotor blade, as well as its aerodynamic performance. Further, certain tip extensions may increase noise in surrounding areas above acceptable limits.

In addition, wind turbines are prone to lightning strikes and, in this regard, it is a common practice to provide the turbine blades with lightning receptors spaced along the longitudinal length of the blade so as to capture and conduct lightning strikes to ground. As such, additional challenges associated with installing tip extensions onto existing rotor blades may include retaining lightning protection system functionality thereof.

Thus, the industry is continuously seeking improved methods for installing tip extensions for wind turbine rotor blades that tie into existing lightning protection systems thereof.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for installing a tip extension onto a tip end of a rotor blade of a wind turbine. The wind turbine includes a lightning protection system installed thereon. The lightning protection system includes, at least, a removable conductive blade tip and a down conductor associated with the rotor blade. Further, the tip extension has a first end, a second end, a closed leading edge, and an at least partially separated trailing edge. Thus, the method includes removing the conductive blade tip of the lightning protection system so as to expose the down conductor. The method also includes securing a conductive extension to the down conductor. Moreover, the method includes sliding the first end of the tip extension over the conductive extension so as to overlap the rotor blade at the tip end. In addition, the method includes securing the conductive blade tip that was previously removed to the conductive extension at the second end of the tip extension. Then, the method includes securing the tip extension to the tip end of the rotor blade.

In one embodiment, the down conductor of the lightning protection system may include a down-conductor member, a down-conductor cable, or any other down conductor of the lightning protection system. Further, the conductive extension may include a first end and a second end. As such, in certain embodiment, the step of securing the conductive extension to the down conductor may include securing the down-conductor member to the first end of the conductive extension within a groove thereof.

In another embodiment, the tip extension may include one or more internal structural components. More specifically, in particular embodiments, the internal structural component(s) may include a transition area structural support or an internal structural channel. In such embodiments, the step of sliding the first end of the tip extension over the conductive extension may include inserting the tip end of the rotor blade into the transition area structural support (e.g. between ribs of the structural support) and inserting the conductive extension into the internal structural channel.

In further embodiments, the step of securing the conductive blade tip to the conductive extension at the second end of the tip extension may include inserting the second end of the conductive extension within a recess of the conductive blade tip and securing one or more fasteners through the conductive blade tip and the second end of conductive extension.

In additional embodiments, the step of securing the tip extension to the rotor blade may include attaching an adhesive side of one or more strips of a double-sided adhesive tape onto either or both of pressure or suction side surfaces of the rotor blade adjacent the tip end or onto interior surfaces of the tip extension. The tape strips have a release liner on an opposite exposed side thereof and each of the tape strips have an extension tail from the release liner that extends beyond the first end of the tip extension when the tip extension is slid onto the tip end of rotor blade. As such, the step of securing the tip extension to the rotor blade may also include, with the tip extension held in place, starting from the tape strip furthest from the at least partially separated trailing edge, sequentially pulling the extension tail and release liner of the respective tape strips through the trailing edge and away from the tip extension at an angle such that that the release liner is removed along the length of the tape strip while maintaining position of tip extension against the rotor blade to attach the exposed adhesive from under the release liner to either or both of the pressure or suction side surfaces of the rotor blade or the interior surface of the tip extension.

In another embodiment, the at least partially separated trailing edge may include a pressure side edge and a suction side edge that each extend past a trailing edge of the rotor blade. Further, the pressure and suction side edges may extend substantially equal distances past the trailing edge of the rotor blade or one of the edges may be offset from the other. As such, the method may also include bonding the pressure and suction side edges together subsequent to removal of the release liners.

In further embodiments, the method may include locating one or more add-on components between or with portions of the pressure side and suction side edges of the at least partially separated trailing edge or to one or more surfaces of the tip extension.

In another aspect, the present disclosure is directed to a method for installing a tip extension onto a tip end of a rotor blade of a wind turbine. The wind turbine has a lightning protection system installed thereon. The lightning protection system has a down conductor and a conductive blade tip secured to the down conductor associated with the rotor blade. Further, the tip extension has a closed leading edge and an at least partially separated trailing edge. Thus, the method includes securing a conductive extension to the conductive blade tip. The method also includes sliding a first portion of the tip extension over the conductive blade tip so as to overlap the rotor blade at the tip end. In addition, the method includes sliding a second portion of the tip extension over the conductive extension. Further, the method includes securing the first portion of the tip extension to the rotor blade. Moreover, the method includes securing the second portion of the tip extension to the first portion.

In one embodiment, the method may also include securing an extended conductive blade tip to the conductive extension such that extended conductive blade tip extends beyond the second portion of the tip extension. It should be understood that the method may further include any of the additional steps and/or features as described herein.

In yet another aspect, the present disclosure is directed to a rotor blade assembly. The rotor blade assembly includes a rotor blade having a root end, a tip end, and pressure and suction side surfaces extending between a leading edge and a trailing edge. Further, the rotor blade assembly includes a lightning protection system installed onto or within the rotor blade. The lightning protection system includes, at least, a down conductor, a conductive blade tip, and at least one lightning receptor located on either of the pressure or suction side surfaces. Further, the rotor blade assembly includes a tip extension having a first end, a second end, a closed leading edge, and a trailing edge defined by at least partially separated pressure and suction side edges that are bonded together and extend chord-wise beyond the trailing edge of the rotor blade. Further, the tip extension includes a conductive extension configured between the first and second ends of the tip extension that electrically couples the down conductor to at least one of the conductive blade tip and/or the at least one lightning receptor so as to maintain the functionality of the lightning protection system. Moreover, the first end of the tip extension overlaps the tip end of the rotor blade.

In one embodiment, the down conductor of the lightning protection system may include a down-conductor member, a down-conductor cable, or any other suitable down conductor. In another embodiment, the conductive extension extends between a first end and a second end. As such, the first end of the conductive extension may include side edges that form a groove. In such embodiments, the down-conductor member may be secured within the groove. Moreover, the second end of the conductive extension may be absent of the side edges and secured within a recess of the conductive blade tip. In addition, the conductive blade tip may be configured at the second end of the tip extension so as to provide a conductive extended root end of the rotor blade.

In alternative embodiments, the down-conductor member may be secured within a recess of the conductive blade tip and the first end of the conductive extension may be secured to the conductive blade tip. In such embodiments, the conductive blade tip may be configured within the tip extension between the first and second ends thereof (i.e. rather than being relocated to the tip end of the rotor blade). As such, the lightning receptor(s) may be electrically coupled to the second end of the conductive extension. In additional embodiments, the rotor blade assembly may further include an extended conductive blade tip electrically coupled to the second end of the conductive extension.

In further embodiments, the tip extension may have a one-piece body or a two-piece body. More specifically, the two-piece body may include a first portion and a second portion. In such embodiments, the first portion may cover the down-conductor member and the conductive blade tip, whereas the second portion may cover at least a portion of the conductive extension. Further, the first portion of the two-piece body may have a separated trailing edge, whereas the second portion may not.

In additional embodiments, as mentioned, the tip extension may include one or more internal structural components, including, for example, a transition area structural support and/or an internal structural channel. As such, the tip end of the rotor blade may be configured to fit within the transition area structural support, whereas the conductive extension may be configured to fit within the internal structural channel. Such internal structural components are configured to provide enhanced structural to the rotor blade.

In further embodiments, the rotor blade assembly may also include an adhesive and/or one or more strips of a double-sided adhesive tape configured for securing the tip extension onto the tip end of the rotor blade and/or for securing the first and second portions of the tip extension together.

In yet another embodiment, the tip extension may include one or more add-on components configured between or with portions of the pressure side and suction side edges of the separated trailing edge and/or with one or more surfaces of the tip extension. For example, in certain embodiments, the add-on component(s) may include a serrated edge, a tape recess (e.g. for leading edge protection tape), an airflow modifying element (such as a vortex generator), a mounting feature, a weep hole, or any other suitable blade add-on component that may be mounted to or integral with the tip extension.

In still further embodiments, the conductive extension and/or the conductive blade tip may be formed via a metal or metal alloy. For example, in certain embodiments, the metal or metal alloy may include aluminum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional wind turbine;

FIG. 2 illustrates a perspective view of one embodiment of a rotor blade of a wind turbine having a tip extension configured with a tip end thereof according to the present disclosure;

FIG. 3 illustrates a perspective view of one embodiment of a wind turbine according to the present disclosure, particularly illustrating a lightning protection system configured therewith;

FIG. 4 illustrates a span-wise view of one embodiment of a rotor blade of a wind turbine according to the present disclosure, particularly illustrating various components of a lightning protection system configured therewith;

FIG. 5 illustrates a perspective view of one embodiment of a single-piece tip extension according to the present disclosure;

FIG. 6 illustrates a top detailed view of the single-piece tip extension of FIG. 5, particularly illustrating a transparent tip extension to further illustrate the internal components thereof;

FIG. 7 illustrates a perspective detailed view of the single-piece tip extension of FIG. 6;

FIG. 8 illustrates a perspective cross-sectional view of the single-piece tip extension of FIG. 5 along line 8-8;

FIG. 9 illustrates a cross-sectional view of the single-piece tip extension of FIG. 5 along line 9-9;

FIG. 10 illustrates a perspective view of one embodiment of the conductive components configured within the tip extension of FIG. 5;

FIG. 11 illustrates a perspective view of one embodiment of a conductive extension configured within the tip extension of FIG. 5;

FIG. 12 illustrates a perspective view of one embodiment of a two-piece tip extension according to the present disclosure;

FIG. 13 illustrates a top detailed view of the two-piece tip extension of FIG. 12, particularly illustrating a transparent tip extension to further illustrate the internal components thereof;

FIG. 14 illustrates a perspective detailed view of the two-piece tip extension of FIG. 13;

FIG. 15 illustrates a perspective cross-sectional view of the two-piece tip extension of FIG. 13 along line 15-15;

FIG. 16 illustrates a side cross-sectional view of the two-piece tip extension of FIG. 13 along line 15-15;

FIG. 17 illustrates a partial perspective view of the tip extension of FIG. 12, particularly illustrating the extended conductive blade tip connected to the conductive extension and extending from the second portion of the tip extension;

FIG. 18 illustrates a partial perspective view of the tip extension of FIG. 12, particularly illustrating the down-conductor member configured within a recess of the existing conductive blade tip with the conductive extension attached thereto and extending into the second portion of the tip extension;

FIG. 19 illustrates a partial perspective view of the second portion of the tip extension of FIG. 12, particularly illustrating an internal structural channel configured therein;

FIG. 20 illustrates a perspective view of the conductive components configured within the tip extension of FIG. 12;

FIG. 21 illustrates a perspective view of another embodiment of a two-piece tip extension according to the present disclosure;

FIG. 22 illustrates a perspective detailed view of the two-piece tip extension of FIG. 21, particularly illustrating a transparent tip extension to further illustrate the internal components thereof;

FIG. 23 illustrates a partial perspective view of the tip extension of FIG. 22, particularly illustrating the down-conductor member configured within a recess of the existing conductive blade tip with the conductive extension attached thereto and extending into the second portion of the tip extension;

FIG. 24 illustrates a side cross-sectional view of the single-piece tip extension of FIG. 22 along line 24-24;

FIG. 25 illustrates a detailed cross-sectional view of the lightning receptor of the tip extension of FIG. 22;

FIG. 26 illustrates a perspective view of the conductive components configured within the tip extension of FIG. 22;

FIG. 27 illustrates a flow diagram of one embodiment of a method for installing a tip extension onto a tip end of a rotor blade of a wind turbine according to the present disclosure;

FIG. 28 illustrates a partial top view of one embodiment of a rotor blade of a wind turbine with a tip extension being slid onto the tip end of the rotor blade according to the present disclosure;

FIG. 29 illustrates is a partial top view of the embodiment of FIG. 28 after the tip extension has been slid into position on the tip end of the rotor blade;

FIG. 30 illustrates a partial top view of the embodiment of FIG. 29 depicting the release liners being peeled from tape strips through the separated trailing edge of the tip extension;

FIG. 31 illustrates a partial top view of the embodiment of FIG. 30 depicting the last release liner being peeled from tape strips through the separated trailing edge of the tip extension; and FIG. 32 illustrates a flow diagram of another embodiment of a method for installing a tip extension onto a tip end of a rotor blade of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a wind turbine 10 of conventional construction. As shown, the wind turbine 10 includes a tower 12 with a nacelle 14 mounted thereon. A plurality of blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade assembly 100 for the wind turbine 10 is illustrated having a tip extension 102 attached to a surface 24 (e.g., suction side surface) of the rotor blade 16 according to the present disclosure. As shown, the rotor blade 16 has a pressure side 22 and a suction side 24 extending between a leading edge 26 and a trailing edge 28, and extends from a root end 34 to a tip end 32. The rotor blade 16 further defines a pitch axis 40 relative to the rotor hub 18 (FIG. 1) that typically extends perpendicularly to the rotor hub 18 and root end 34 through the center of the root end 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40. Further, the rotor blade assembly 100 defines a chord 42 and a span 44. For example, as shown in FIG. 2, the chord 42 may vary throughout the span 44 of the rotor blade 16. Thus, a local chord may be defined for the blade 16 at any point on the blade 16 along the span 44.

Referring now to FIGS. 3 and 4, the rotor blade assembly 100 may also include a lightning protection system 50 configured therewith. For example, as shown, schematic diagrams of various components of one embodiment of the lightning protection system 50 are illustrated according to the present disclosure. More specifically, FIG. 3 illustrates a perspective view of one embodiment of a lightning protection system 50 configured with the wind turbine 10, whereas FIG. 4 illustrates a cross-sectional view of one of the rotor blades 16 of the wind turbine 10 having a portion of the lightning protection system 50 configured therein.

As shown, the lightning protection system 50 includes one or more conductive circuits 52 configured at least partially within an internal cavity 36 of one or more of the rotor blades 16 of the wind turbine 10. Further, as shown in FIG. 4, each of the conductive circuits 52 may include one or more down conductors 55, a conductive blade tip 59, and at least one lightning receptor 54 located on either of the pressure or suction side surfaces 22, 24 of the rotor blade 16. For example, as shown in the illustrated embodiment, the down conductor(s) 55 of the lightning protection system 50 may include a down-conductor member 57 (e.g., a down-conductor fork or other suitable member), the down-conductor cable 56, or any other suitable down conductor. Further, as shown, the lightning receptors 54 are provided on both of the pressure and suction sides 22, 24. In an alternative embodiment, the lightning receptors 54 may be provided on only one of the sides of the rotor blade 16. It should be understood that the lightning receptors 54 may be variously configured within the scope and spirit of the invention, and may include any metal or metalized component (i.e., a metal screen, a metal rod or tip, a metal fastener, and/or the like) mounted on the pressure and/or suction sides 22, 24 of the rotor blade 16 for the purpose of conducting lightning strikes to ground. In addition, as shown in FIG. 4, the lightning receptors 54 may be connected via one or more lightning conductors or conductive cables 56 configured within the internal cavity 36 of the rotor blade 16. As such, the conductive cables 56 may have a gauge suitable for defining a conductive leg for transmitting a lightning strike on any one of the receptors 54 to ground. Further, the conductive cable(s) 56 may be connected to an outer or inner surface of the rotor blade(s) 16. In addition, each of the rotor blades 16 may be configured in a similar manner.

Still referring to FIGS. 3 and 4, the respective lightning conductive circuits 52 for each of the rotor blades 16 may include terminal ends 58 that extend through the root end 34 of the rotor blades 16 and are individually connected to a grounding system 60 within the rotor hub 18. The grounding system 60 may be variously configured, as is well known in the art. For example, the grounding system 60 may include any conductive path defined by the wind turbine's machinery or support structure, including blade bearings, machinery bed plates, tower structure, and the like, that defines any suitable ground conductive path 62 from the rotor blades 16, through the tower 12, to a ground rod 64 via a ground cable 66, or other suitable electrical ground path. In other embodiments, the conductive circuit 52 may be defined by components that are embedded in the rotor blade 16, or are external to the rotor blade 16, for example along the outer surfaces 22, 24 of the rotor blade 16.

Referring particularly to FIG. 4, each rotor blade 16 may include a single conductive circuit 52, as depicted, with each of the lightning receptors 54 configured in series within the single circuit 52. In an alternative embodiment, each of the rotor blades 16 may include a plurality of circuits 52, with each of the lightning receptors 54 configured in one of the respective circuits 52. In still further embodiments, the receptors 54 may be connected in any suitable fashion via the conductive cable(s) 56 and it should be understood that the embodiment of FIGS. 3 and 4 is provided for example purposes only and is not intended to be limiting.

Referring now to FIGS. 5-11, one embodiment of the tip extension 102 of the present disclosure is illustrated according to the present disclosure. More specifically, the embodiment of FIGS. 5-11 illustrates a tip extension 102 that utilizes the existing conductive blade tip 59 of the lightning protection system 50 at its outermost location. Further, as shown in FIG. 5, the tip extension 102 has a generally hollow body 108 having a first end 103, a second end 109, a closed leading edge 104, and a trailing edge 106 defined by separated pressure and suction side edges 105, 107 that are bonded together and extend chord-wise beyond the trailing edge 28 of the rotor blade 16 when mounted thereto. Moreover, the trailing edge 106 is separated in that the a suction side edge 105 and a pressure side edge 107 are not bonded or sealed together along at least part of the length of the trailing edge 106, which allows the pressure and suction sides of the tip extension 102 to be pulled apart to an extent necessary to slide the tip extension 102 onto the tip end 32 of the rotor blade 16. In certain embodiments as depicted in the figures, the trailing edge 106 is separated along essentially the entire length of the trailing edge, although this is not a requirement for all embodiments. Further, as shown in FIGS. 2 and 6-7, the first end 103 of the tip extension 102 is configured to overlap the tip end 32 of the rotor blade 16. As such, the rotor blade assembly 100 may also include an adhesive or one or more strips of a double-sided adhesive tape configured for securing the tip extension 102 onto the tip end 32 of the rotor blade 16 when mounted thereto, which will be described in more detail below.

In additional embodiments, the tip extension 102 of the present disclosure may be formed using any suitable manufacturing processes. For example, in certain embodiments, the tip extension 102 described herein may be formed via three-dimensional (3D) printing. As such, the tip extension 102 can be constructed as a single component or a limited number of components, such as two components which is described herein. 3D printing offers a number of advantages for the tip extension 102, including but not limited to the ability to have an extension with a solid and very thin trailing edge at the outermost portion and a split trailing edge further inboard to aid in installation (which is described in more detail below). Further, 3D printing of the tip extension 102 provides an automated and economical manufacturing process that produces the desired shape that can be easily customized for various lengths, sizes, and internal geometry to match up to the existing blade surface for bonding with adhesives.

More specifically, as shown in FIGS. 6-9, the tip extension 102 can be easily designed with one or more internal structural components 136, including for example, a transition area structural support 138 and/or an internal structural channel 140. As such, the structural component(s) 136 are configured to house and electrically insulate the conductive components described herein. For example, the tip end 32 of the rotor blade 16 may be configured to fit within the transition area structural support 138, whereas the conductive extension 115 may be configured to fit within the internal structural channel 140. Further, the internal structural components 136 of the tip extension 102 may contain internal ribs and/or additional structure to cradle the original tip end 32 of the rotor blade 16 for additional support.

Referring generally to FIGS. 6-11, the tip extension 102 also includes a conductive extension 115 configured between the first and second ends 103, 109 of the tip extension 102. Thus, as shown in the illustrated embodiment, the conductive extension 115 is configured to electrically couple the down-conductor member 57 of the lightning protection system 50 to the removable conductive blade tip 59. More specifically, as shown in FIG. 11, the conductive extension 115 may include a first end 117 and a second end 119. Further, as shown, the first end 117 of the conductive extension 115 may include side edges 121 that form a groove 123. Thus, as shown in FIG. 10, the down-conductor member 57 may be secured within the groove 123 of the conductive extension 115. Moreover, as shown in FIGS. 10-11, the second end 119 of the conductive extension 115 may be absent of the side edges 121 so that it can be secured within a recess 125 of the conductive blade tip 59. In addition, as shown in FIGS. 5-8, when the conductive blade tip 59 is secured to the second end 119 of the conductive extension 115, the conductive blade tip 59 is also configured at the second end 109 of the tip extension 102 so as to provide an extended root end 126 of the rotor blade 16.

Referring now to FIGS. 12-20, another embodiment of a tip extension 102 according to the present disclosure is illustrated. More specifically, as shown, the embodiment of FIGS. 12-20 illustrates a tip extension 102 that maintains the existing conductive blade tip 59 as-is but rather attaches the conductive extension 115 and an additional extended conductive blade tip 132 thereto to maintain the functionality of the lightning protection system 50. Like the embodiment illustrated in FIGS. 5-11, the tip extension 102 of FIGS. 12-20 has a generally hollow body 108 having a first end 103, a second end 109, a closed leading edge 104, and a trailing edge 106 defined by separated pressure and suction side edges 105, 107 that are bonded together and extend chord-wise beyond the trailing edge 28 of the rotor blade 16 when mounted thereto. In contrast to the embodiment illustrated in FIGS. 5-11, however, the tip extension 102 has a two-piece body including a first portion 128 and a second portion 130. Further, the down-conductor member 57 is secured within the recess 125 of the conductive blade tip 59 (i.e. rather than within the groove 123 of the conductive extension 115). Moreover, the first end 117 of the conductive extension 115 is secured to the existing conductive blade tip 59 and the second end 119 of the conductive extension 115 is secured to the extended conductive blade tip 132, e.g. via one or more fasteners 134 that may also be configured as lightning receptors.

Thus, as shown in the illustrated embodiment of FIGS. 12-20, the conductive extension 115 is configured to electrically couple the existing conductive blade tip 59 to the extended conductive blade tip 132. In other words, the existing conductive blade tip 59 remains at the tip end 32 of the rotor blade 16 with the tip extension 102 mounted thereto. In such embodiments, the conductive blade tip 59 may be configured within the tip extension 102 between the first and second ends 103, 109 thereof. In addition, as shown in FIGS. 13-16, the first portion 128 may cover the down-conductor member 57 and the conductive blade tip 59, whereas the second portion 130 may cover at least a portion of the conductive extension 115.

Referring specifically to FIGS. 13-16 and 18-19, as mentioned, the tip extension 102 may include one or more internal structural components 136. For example, as shown, the internal structural components 136 include the transition area structural support 138 and the internal structural channel 140. As such, the tip end 32 of the rotor blade 16 may be configured to fit within the transition area structural support 138, whereas the conductive extension 115 may be configured to fit within the internal structural channel 140.

In additional embodiments, the conductive components described herein may be formed of any suitable materials. For example, in certain embodiments, the conductive extension 115 and/or the conductive blade tip 59 may be constructed of a metal or metal alloy. More specifically, in particular embodiments, the metal or metal alloy may include aluminum.

Referring now to FIGS. 21-26, still another embodiment of a tip extension 102 according to the present disclosure is illustrated. More specifically, as shown, the embodiment of FIGS. 21-26 illustrates a tip extension 102 that maintains the existing conductive blade tip 59 as-is but attaches the conductive extension 115 thereto having at least one lightning receptor 134 to maintain the functionality of the lightning protection system 50. Like the embodiment illustrated in FIGS. 12-20, the tip extension 102 has a generally hollow body 108 having a first end 103, a second end 109, a closed leading edge 104, and a trailing edge 106 defined by separated pressure and suction side edges 105, 107 that are bonded together and extend chord-wise beyond the trailing edge 28 of the rotor blade 16 when mounted thereto. Further, like the embodiment illustrated in FIGS. 12-20, the tip extension 102 has a two-piece body including a first portion 128 and a second portion 130. In addition, as shown, the down-conductor member 57 is secured within the recess 125 of the conductive blade tip 59. Moreover, the first end 117 of the conductive extension 115 is secured to the existing conductive blade tip 59. In contrast to the embodiment of FIGS. 12-20, however, the second end 119 of the conductive extension 115 includes at least one lightning receptor 134 that extends through a surface of the tip extension 102 (FIGS. 21-24) (rather than having the extended conductive blade tip 132 connected thereto). In such an embodiment, as shown in FIG. 25, the lightning receptor 134 may be a fastener that extends longer than, for example, the lightning receptors 134 of FIGS. 13-16 and 18-20 that sit recessed within the tip extension 102.

In addition, as shown in FIGS. 21-23, the tip extension 102 may include one or more optional add-on components 142 configured between or with portions of the pressure and suction side edges 105, 107 of the separated trailing edge 106 and/or with one or more surfaces of the tip extension 102. For example, as shown, the add-on component(s) 102 may include a serrated edge 144 (e.g. for noise reduction), a tape recess (e.g. for leading edge protection tape), an airflow modifying element (such as a vortex generator 146), a mounting feature (e.g. for an airflow modifying element), a winglet, a weep hole 148, or any other suitable blade add-on component that may be mounted to or integral with the tip extension 102.

More specifically, if the pressure and suction side edges 105, 107 are not offset, the add-on component 142 may be defined (e.g., by laser cutting) into the combination of the bonded surfaces 105, 107. In an alternate embodiment, to reduce the thickness of the add-on component 142, the feature may be defined in one of the edges 105, 107 that extend chord-wise beyond the other edge. For example, in the embodiment depicted in FIGS. 21-23, the suction side surface edge 105 of the separated trailing edge 106 extends past the pressure side surface edge 107, with the add-on component 142 defined in the suction side surface edge 105 in the form of a serrated edge 144. It should be appreciated that the add-on component 142 is depicted as a serrated profile for purposes of illustration only, and that any design of add-on component 142 is within the scope and spirit of the invention. In an alternate embodiment, the suction and pressure surface edges 105, 107 may extend equally beyond the trailing edge 28 and the add-on component 142 may be bonded therebetween.

Referring now to FIGS. 27-31, one embodiment of a method 200 for installing the tip extension 102 of the present disclosure onto the tip end 32 of the rotor blade 16 the wind turbine 10 is illustrated. As shown at 202, the method 200 includes removing the existing conductive blade tip 59 of the lightning protection system 50 so as to expose a down conductor 55 of the lightning protection system 50. For example, in certain embodiments, as mentioned, the down conductor 55 corresponds to the down-conductor member 57. In such embodiments, when the conductive blade tip 59 is removed, the down-conductor member 57 is left exposed.

Thus, as shown at 204, the method 200 also includes securing the conductive extension 115 to the down conductor 55 (i.e. the down-conductor 57). Moreover, as shown at 206, the method 200 includes sliding the first end 103 of the tip extension 102 over the conductive extension 115 so as to overlap the rotor blade 16 at the tip end 32 thereof. For example, FIG. 28 illustrates one embodiment of the first end 103 of the tip extension 102 being slid over the tip end 32 of the rotor blade 16. Further, the embodiment of FIGS. 28-31 is generally described in U.S. patent application Ser. No. 14/706,024 entitled "Attachment Method and System to Install Components, such as Tip Extensions and Winglets, to a Wind Turbine Blade," filed on May 7, 2015, which is incorporated herein by reference in its entirety. Although FIG. 28 depicts (by arrows) the tip extension 102 being slid linearly in a span-wise direction onto the rotor blade 16, it should be appreciated that this sliding motion may include a chord-wise direction component that is aided by the separated nature of the trailing edge 106. More specifically, in certain embodiments, the step of sliding the first end 103 of the tip extension 102 over the conductive extension 115 may include inserting the tip end 32 of the rotor blade 16 into the transition area structural support 138 and inserting the conductive extension 115 into the internal structural channel 140.

In addition, as shown at 208, the method 200 includes securing the conductive blade tip 59 to the conductive extension 115 at the second end 109 of the tip extension 102. For example, in particular embodiments, the step of securing the conductive blade tip 59 to the conductive extension 115 at the second end 109 of the tip extension 102 may include inserting the second end 119 of the conductive extension 115 within the recess 125 of the conductive blade tip 59 and securing one or more fasteners through the conductive blade tip 59 and the second end 119 of conductive extension 115.

Further, as shown at 210, the method 200 includes securing the tip extension 102 to the rotor blade 16. More specifically, as shown in FIGS. 28-31, the step of securing the tip extension 102 to the rotor blade 16 may include attaching an adhesive side of one or more strips 110 of a double-sided adhesive tape onto either or both of pressure or suction side surfaces of the rotor blade 16 adjacent the tip end 32 or onto interior surfaces of the tip extension 102 in any desired pattern or configuration. It should be appreciated that a single, larger strip of tape 110 could also be utilized in place of multiple strips. Although not depicted in the figures, the tape strips may also be adhered to the pressure side surface 22. The pattern of the tape strips 110 may be span-wise oriented and spaced-apart, as depicted in FIG. 28. It should be appreciated that the tape strips 110 may be applied to either or both of the blade surfaces 22, 24.

Further, as shown in FIGS. 28 and 29, the tape strips 110 have a release liner 112 on an opposite exposed side thereof and each of the tape strips 110 have an extension tail 113 from the release liner 112 that extends beyond the first end 103 of the tip extension 102 when the tip extension 102 is slid onto the tip end 32 of rotor blade 16. The length of the extension tails 113 may vary. For example, the strips 110 furthest from the trailing edge 106 may have a longer extension tail 113 to facilitate pulling the extension tail 113 through the trailing edge 106, as compared to the tape strip 110 closest to the trailing edge 106. Alternatively, the extension tail 113 may encompass any other material or component that is attached to the tape strip, such as a wire, string, ribbon, and so forth. With the illustrated embodiment, because the extension tails 113 are comprised of the release liner 112 and underlying adhesive, after removal of the release liner 112, the remaining adhesive layer of the tape strips adhesive 111 remains, as depicted in FIGS. 30 and 31, and may need to be trimmed.

As such, the step of securing the tip extension 102 to the rotor blade 16 may also include, with the tip extension 102 held in place, starting from the tape strip 110 furthest from the separated trailing edge 106, sequentially pulling the extension tail 113 and release liner 112 of the respective tape strips 110 through the separated trailing edge 106 and away from the tip extension 102 at an angle such that that the release liner 112 is removed along the length of the tape strip 110 while maintaining position of tip extension 102 against the rotor blade 16 to attach the exposed adhesive 110 from under the release liner 112 to either or both of the pressure or suction side surfaces of the rotor blade 16 or the interior surface of the tip extension 102 (FIGS. 29-31). Further, in the embodiment of FIG. 28, the tape strips 110 are initially adhered to the blade surface 24, wherein the tip extension 102 is subsequently held or otherwise maintained in the desired position on the rotor blade 16 (e.g., by being pressed against the tape strips 110) for subsequent removal of the release liner 112 from between the underside of the tip extension 102 and the tape 110. It should be appreciated that there may be some degree of inherent "play" or movement of the tip extension 102 at the desired position on the rotor blade 16 as the release liners 112 are removed.

In an alternate embodiment, the tape strips 110 may be applied to an interior surface of the tip extension 102 in the same pattern discussed above, which is then pressed against the blade surface 24, 22 for subsequent removal of the release liner 112 from the opposite side of the tape 110. It should be appreciated that the methods described herein may be implemented with a number of different commercially available double-sided adhesive tapes. These tapes generally have a lower shear modulus than the tip extension 102 to allow for shear slippage between the tip extension 102 and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

FIG. 28 also depicts an additional aspect that may be incorporated into any of the other embodiments described herein. In particular, an adhesive 116 is depicted as underlying the adhesive tape strips 110. In certain embodiments, it may be desired to coat the surface of the rotor blade 16 where the tip extension 102 will be placed with a liquid or paste adhesive (e.g., and epoxy) 116, for example to compensate for any surface irregularities or mismatch between the blade surface and the tip extension 102 due, for example, to machining tolerances, before positioning the tape strips 110 on the blade surface 24. The tape strips 110 and the tip extension 102 can then be attached before the adhesive 116 cures, which provides a degree of positioning adjustment of the tip extension 102 due to the fact that the adhesive 116 is still in liquid or paste form. Alternatively, the adhesive 116 (with tape strips attached thereto) may be allowed to cure before placement of the tip extension 102. In either case, this particular embodiment also gives the advantage of a strong bond provided by the adhesive 116 in combination with the shear stress reduction provided by the tape strips 110.

In another embodiment, as mentioned, the separated trailing edge 106 may include pressure and suction side edges 105, 107 that each extend past the trailing edge 28 of the rotor blade 16 to provide a chord-wise extension aspect to the tip extension 102. As such, the method 200 may also include bonding the pressure and suction side edges 105, 107 together subsequent to removal of the release liners 112 and after attaching the tip extension 102 to the rotor blade 16. The edges 105, 107 may extend an equal chord-wise distance past the blade trailing edge 28, or the edges 105, 107 may be offset in that one of the edges extends past the other. The dashed line indicating the pressure side surface edge 107 is meant to depict both of these configurations.

In further embodiments, as mentioned, the method 200 may include locating one or more add-on components 142 (FIGS. 21-23) between portions of the pressure side and suction side edges 105, 107 of the separated trailing edge 106 and/or to one or more surfaces of the tip extension 102.

Referring now to FIG. 32, a flow diagram of another embodiment of a method 300 for installing the tip extension 102 onto the tip end 32 of the rotor blade 16 of the wind turbine 10 is illustrated. More specifically, in particular embodiments, the method 300 of FIG. 32 can be applied to the tip extension 102 illustrated in the embodiment of FIGS. 12-20. Thus, as shown at 302, the method 300 includes securing the conductive extension 115 to the conductive blade tip 59. As shown at 304, the method 300 includes sliding a first portion 128 of the tip extension 102 over the conductive blade tip 59 so as to overlap the rotor blade 16 at the tip end 32 thereof. As shown at 306, the method 300 includes sliding a second portion 130 of the tip extension 102 over the conductive extension 115. As shown at 308, the method 300 includes securing an extended conductive blade tip 132 to the conductive extension 115 such that extended conductive blade tip 132 extends beyond the second portion 130 of the tip extension 102. As shown at 310, the method 300 includes securing the first portion 128 of the tip extension 102 to the rotor blade 16, e.g. using any suitable attachment methods (such as those illustrated in FIGS. 28-31). As shown at 312, the method 300 also includes securing the second portion 130 of the tip extension 102 to the first portion 128.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing a tip extension onto a tip end of a rotor blade of a wind turbine, the wind turbine having a lightning protection system installed thereon, the lightning protection system having, at least, a removable conductive blade tip and a down conductor associated with the rotor blade, the tip extension having a first end, a second end, a closed leading edge, and an at least partially separated trailing edge, the down conductor comprising a down-conductive member, the method comprising:
  removing the conductive blade tip of the lightning protection system so as to expose the down conductor;
  securing the down-conductor member to a first end of a conductive extension within a groove thereof;
  sliding the first end of the tip extension over the conductive extension so as to overlap the rotor blade at the tip end;
  securing the conductive blade tip to the conductive extension at the second end of the tip extension; and,
  securing the tip extension to the tip end of the rotor blade.

2. The method of claim 1, wherein the tip extension further comprises one or more internal structural components, the one or more internal structural components comprising at least one of a transition area structural support or an internal structural channel.

3. The method of claim 2, wherein sliding the first end of the tip extension over the conductive extension so as to overlap the rotor blade at the tip end further comprises inserting the tip end of the rotor blade into the transition area structural support and inserting the conductive extension into the internal structural channel.

4. The method of claim 1, wherein securing the conductive blade tip to the conductive extension at the second end of the tip extension further comprises:
  inserting a second end of the conductive extension within a recess of the conductive blade tip; and,
  securing one or more fasteners through the conductive blade tip and the second end of conductive extension.

5. The method of claim 4, wherein the conductive blade tip is configured at the second end of the tip extension so as to provide an extended root end of the rotor blade.

6. The method of claim 1, wherein securing the tip extension to the rotor blade further comprises:

attaching an adhesive side of one or more strips of a double-sided adhesive tape onto either or both of pressure or suction side surfaces of the rotor blade adjacent the tip end or onto interior surfaces of the tip extension, the tape strips having a release liner on an opposite exposed side thereof, each of the tape strips having an extension tail from the release liner that extends beyond the first end of the tip extension when the tip extension is slid onto the tip end of rotor blade; and, with the tip extension held in place, starting from the tape strip furthest from the separated trailing edge, sequentially pulling the extension tail and release liner of the respective tape strips through the separated trailing edge and away from the tip extension at an angle such that that the release liner is removed along the length of the tape strip while maintaining position of tip extension against the rotor blade to attach the exposed adhesive from under the release liner to either or both of the pressure or suction side surfaces of the rotor blade or the interior surface of the tip extension.

7. The method of claim 6, wherein the separated trailing edge comprises a pressure side edge and a suction side edge that each extend past a trailing edge of the rotor blade, and further comprising bonding the pressure and suction side edges together subsequent to removal of the release liners.

8. The method as in claim 7, further comprising locating one or more add-on components between or with portions of the pressure side and suction side edges of the separated trailing edge or to one or more surfaces of the tip extension.

9. A method for installing a tip extension onto a tip end of a rotor blade of a wind turbine, the wind turbine having a lightning protection system installed thereon, the lightning protection system having, at least, a down conductor and a conductive blade tip secured to the down conductor associated with the rotor blade, the tip extension having a closed leading edge and an at least partially separated trailing edge, the method comprising:

securing a conductive extension to the conductive blade tip;

sliding a first portion of the tip extension over the conductive blade tip so as to overlap the rotor blade at the tip end;

sliding a second portion of the tip extension over the conductive extension;

securing the first portion of the tip extension to the rotor blade; and, securing the second portion of the tip extension to the first portion.

10. The method of claim 9, further comprising securing an extended conductive blade tip to the conductive extension such that extended conductive blade tip extends beyond the second portion of the tip extension.

11. The rotor blade assembly of claim 9, further comprising at least one of an adhesive or one or more strips of a double-sided adhesive tape configured for securing the tip extension onto the tip end of the rotor blade.

12. The rotor blade assembly of claim 9, wherein the tip extension further comprises one or more add-on components configured between or with portions of the pressure side and suction side edges of the separated trailing edge or with one or more surfaces of the tip extension, the one or more add-on components comprising at least one of a serrated edge, a tape recess, an airflow modifying element, a mounting feature, or a weep hole.

13. A rotor blade assembly, comprising:

a rotor blade comprising a root end, a tip end, a pressure side surface and a suction side surface extending between a leading edge and a trailing edge;

a lightning protection system installed onto the rotor blade, the lightning protection system comprising a down conductor, a conductive blade tip, and at least one lightning receptor located on either of the pressure or suction side surfaces, the down conductor comprising a down-conductor member, the down-conductor member being secured within a recess of the conductive blade tip: and, a tip extension comprising a first end and a second end, a closed leading edge, a trailing edge defined by at least partially separated pressure and suction side edges that are bonded together and extend chord-wise beyond a trailing edge of the rotor blade, and a conductive extension having a first end and a second end configured between the first and second ends of the tip extension, the first end of the tip extension overlapping the tip end of the rotor blade, the first end of the conductive extension being secured the conductive blade tip, the conductive extension electrically coupling the down conductor to at least one of the conductive blade tip or the at least one lightning receptor.

14. The rotor blade assembly of claim 13, wherein the conductive blade tip is configured within the tip extension between the first and second ends thereof, wherein the at least one lightning receptor is electrically coupled to the second end of the conductive extension.

15. The rotor blade assembly of claim 14, further comprising an extended conductive blade tip electrically coupled to the second end of the conductive extension.

16. The rotor blade assembly of claim 15, wherein the tip extension comprises a two-piece body having a first portion and a second portion, the first portion covering at least a portion of the down-conductor member and the conductive blade tip, the second portion covering at least a portion of the conductive extension.

17. The rotor blade assembly of claim 13, wherein the tip extension further comprises one or more internal structural components, the one or more internal structural components comprising at least one of a transition area structural support or an internal structural channel, the tip end of the rotor blade configured to fit within the transition area structural support, the conductive extension configured to fit within the internal structural channel.

\* \* \* \* \*